US012668346B1

(12) United States Patent     (10) Patent No.:   US 12,668,346 B1

Ikegaya     (45) Date of Patent:    Jun. 30, 2026

(54) PROPULSION SYSTEM OF MARINE VESSEL AND MARINE PROPULSION METHOD OF MARINE VESSEL

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 952 days.

(21) Appl. No.: 17/102,467

(22) Filed: Nov. 24, 2020

Related U.S. Application Data

(60) Provisional application No. 62/953,712, filed on Dec. 26, 2019.

(51) Int. Cl.
|   |   |
|---|---|
| B63H 25/04 | (2006.01) |
| B63H 20/00 | (2006.01) |
| B63H 20/12 | (2006.01) |
| B63H 25/02 | (2006.01) |
| G05D 1/00 | (2024.01) |

(52) U.S. Cl.
CPC ............. B63H 25/04 (2013.01); B63H 20/12 (2013.01); G05D 1/0206 (2013.01); *B63H 2020/003* (2013.01); *B63H 2025/022* (2013.01); *B63H 2025/024* (2013.01); *B63H 2025/045* (2013.01)

(58) Field of Classification Search
CPC .. B63H 25/04; B63H 20/12; B63H 2020/003; B63H 2025/022; B63H 2025/024; B63H 2025/045; G05D 1/0206
See application file for complete search history.

(56) References Cited

U.S. PATENT DOCUMENTS

| | | | | |
|---|---|---|---|---|
| 3,991,696 | A | * | 11/1976 | Aoki .......................... B63B 1/08 |
| | | | | 114/57 |
| 2005/0264099 | A1 | * | 12/2005 | Kamiya .................... B60T 7/22 |
| | | | | 303/15 |
| 2008/0033621 | A1 | | 2/2008 | Nakamura et al. |
| 2017/0045887 | A1 | * | 2/2017 | Mazin .................. G05D 1/0044 |
| 2017/0255201 | A1 | * | 9/2017 | Arbuckle ................ B63J 99/00 |
| 2018/0134286 | A1 | * | 5/2018 | Yi .......................... B60W 10/20 |
| 2019/0084662 | A1 | * | 3/2019 | Wong ..................... B63H 25/04 |
| 2019/0155287 | A1 | * | 5/2019 | Arbuckle ................ G08G 3/02 |
| 2019/0300138 | A1 | * | 10/2019 | Akuzawa ................. G05D 1/02 |
| 2020/0247518 | A1 | * | 8/2020 | Dannenberg .......... B63H 25/42 |
| 2020/0342760 | A1 | * | 10/2020 | Vassilovski ..... B60W 30/18159 |

FOREIGN PATENT DOCUMENTS

| | | |
|---|---|---|
| JP | 2002-090171 A | 3/2002 |
| JP | 2008-056226 A | 3/2008 |

\* cited by examiner

*Primary Examiner* — Kenneth J Malkowski
*Assistant Examiner* — Ibrahim Abdoalatif Alsomairy
(74) *Attorney, Agent, or Firm* — Keating & Bennett, LLP

(57) ABSTRACT

A propulsion system for a marine vessel includes a controller configured or programmed to perform a control to automatically steer the marine vessel, and to control a propulsion device to decelerate the marine vessel based on an orientation of the marine vessel with respect to a target position and a current position of the marine vessel with respect to the target position.

17 Claims, 11 Drawing Sheets

*FIG.8A*          *FIG.8B*          *FIG.8C*
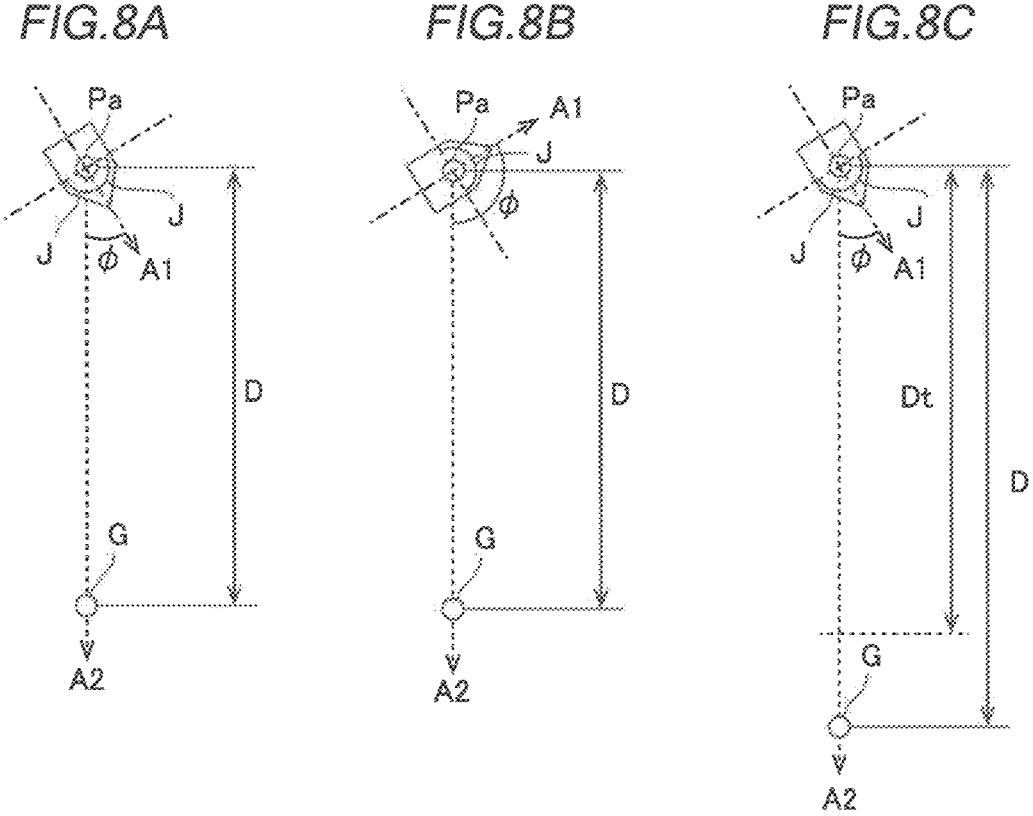
*FIG.9*
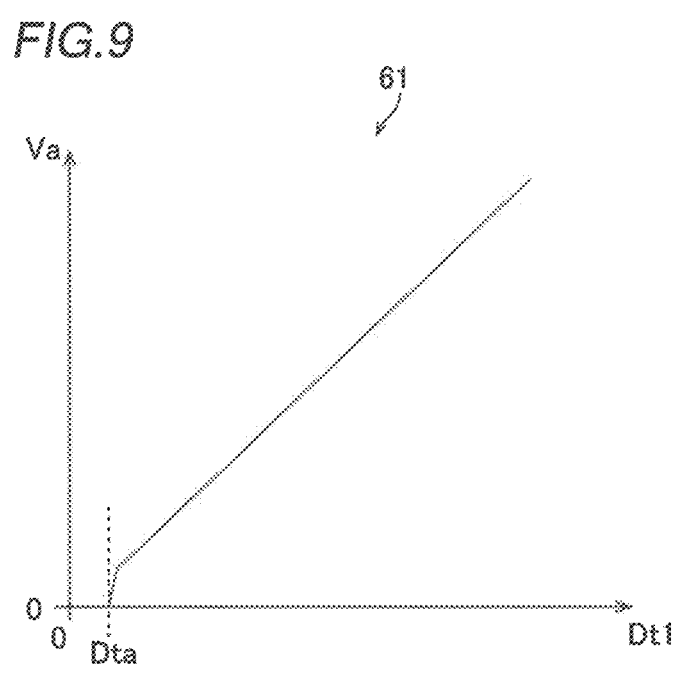

*FIG.13*
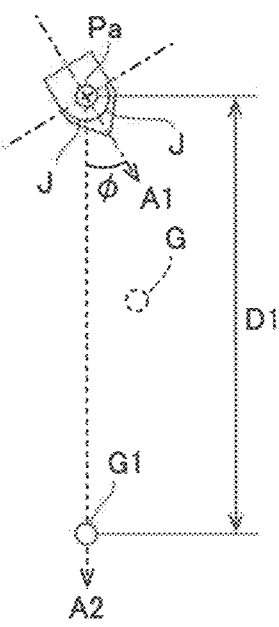
*FIG.14A*          *FIG.14B*
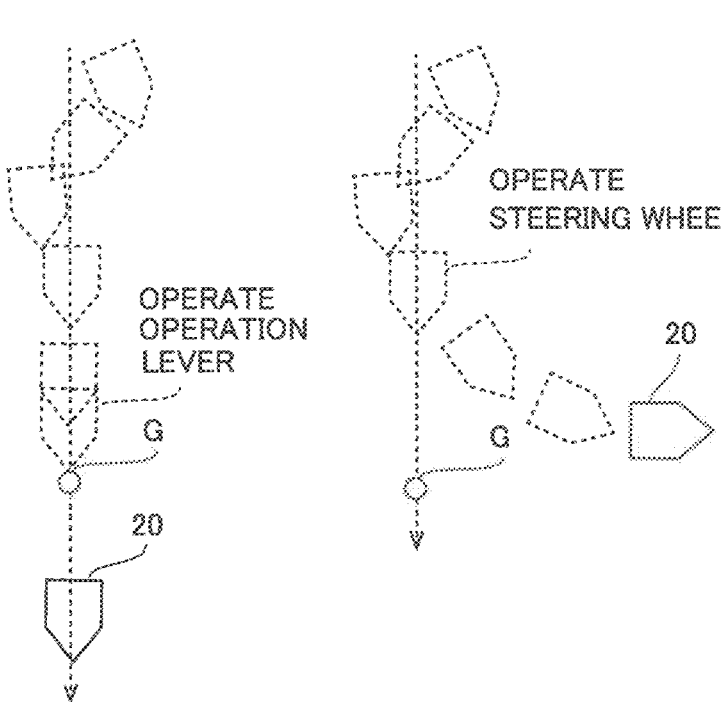

PROPULSION SYSTEM OF MARINE VESSEL AND MARINE PROPULSION METHOD OF MARINE VESSEL

CROSS REFERENCE TO RELATED APPLICATIONS

This application claims the benefit of priority to U.S. Provisional Application No. 62/953,712 filed on Dec. 26, 2019. The entire contents of this application are hereby incorporated herein by reference.

BACKGROUND OF THE INVENTION

1. Field of the Invention

The present invention relates to a propulsion system of a marine vessel and a propulsion control method of a marine vessel.

2. Description of the Related Art

A propulsion system of a marine vessel and a propulsion control method of a marine vessel that each acquire a target position is known in general. Such a propulsion system of a marine vessel is disclosed in Japanese Patent Laid-Open No. 2002-090171, for example.

Japanese Patent Laid-Open No. 2002-090171 discloses a propulsion system of a marine vessel including a global positioning system (GPS) receiver, a steering mechanism, and an automatic course holding device. The automatic course holding device acquires the position, speed, and moving direction of a marine vessel from the GPS receiver. The automatic course holding device outputs a command steering angle signal to the steering mechanism based on the acquired position, speed, and moving direction of the marine vessel. The steering mechanism changes the orientation of a hull based on the command steering angle signal. Thus, the marine vessel navigates along a planned course determined by the automatic course holding device.

Although not described in Japanese Patent Laid-Open No. 2002-090171, when a marine vessel navigates along the planned course using a conventional propulsion system of a marine vessel as described above, movement of the marine vessel conceivably continues even when the marine vessel reaches the final point (target position) of the planned course. Therefore, in the conventional propulsion system of the marine vessel, a user needs to operate the marine vessel after the marine vessel reaches the target position of the planned course and after the marine vessel has passed through the target position. Alternatively, in the conventional propulsion system of the marine vessel, the user needs to operate the marine vessel before the marine vessel reaches the target position of the planned course. Therefore, conventionally, a propulsion system of a marine vessel and a propulsion control method of a marine vessel that each reduce the work burden on a user when the marine vessel is automatically moved toward a target position have been desired.

SUMMARY OF THE INVENTION

Preferred embodiments of the present invention provide propulsion systems of marine vessels and propulsion control methods of marine vessels that each reduce the work burden on a user when the marine vessels are automatically moved toward target positions.

According to a preferred embodiment of the present invention, a propulsion system of a marine vessel includes a propulsion device, and a controller configured or programmed to acquire a target position of the marine vessel, a current position of the marine vessel, and an orientation of the marine vessel, and to perform a control to automatically steer the marine vessel based on the target position, the current position of the marine vessel, and the orientation of the marine vessel that have been acquired. The controller is configured or programmed to control the propulsion device to decelerate the marine vessel based on the orientation of the marine vessel with respect to the target position and the current position of the marine vessel with respect to the target position.

In the propulsion system of the marine vessel described above, the controller is configured or programmed to control the propulsion device to decelerate the marine vessel based on the orientation of the marine vessel with respect to the target position and the current position of the marine vessel with respect to the target position. Accordingly, the marine vessel is decelerated based on the current position of the marine vessel with respect to the target position, and thus the marine vessel is automatically decelerated before the marine vessel passes through the target position. The marine vessel is decelerated based on the orientation of the marine vessel with respect to the target position, and thus the marine vessel is decelerated when the orientation of the marine vessel is appropriate for deceleration. In other words, deceleration of the marine vessel is significantly reduced or prevented when it is not appropriate to decelerate the marine vessel such as when the orientation of the marine vessel is facing in an opposite direction to the target position such that the marine vessel is moving away from the target position. Consequently, when the marine vessel automatically moves toward the target position, the operation of a user (operator) to decelerate the marine vessel is eliminated. Thus, when the marine vessel is automatically moved toward the target position, the work burden on the user is reduced.

In the propulsion system of the marine vessel described above, the controller is preferably configured or programmed to control the propulsion device to decelerate the marine vessel based on the current position of the marine vessel with respect to the target position when a relative angle of the orientation of the marine vessel with respect to a direction from the marine vessel toward the target position is within an angle threshold range. Accordingly, when the relative angle of the orientation of the marine vessel is within the angle threshold range and the orientation of the marine vessel is facing the target position, the marine vessel is decelerated. Consequently, the marine vessel is decelerated while approaching the target position, and thus the marine vessel is moved to the target position or the vicinity of the target position while passage of the marine vessel through the target position is significantly reduced or prevented.

In the propulsion system of the marine vessel described above, the controller is preferably configured or programmed to control the propulsion device to decelerate the marine vessel based on the orientation of the marine vessel with respect to the target position and the current position of the marine vessel with respect to the target position when a plurality of via-points through which the marine vessel travels are acquired and the marine vessel has traveled through all of the plurality of via-points. When the controller acquires the plurality of via-points, the marine vessel may approach the target position before the marine vessel travels through all of the plurality of via-points. At this time, when the marine vessel is decelerated, the marine vessel may conceivably stop without traveling through the via-points. In this regard, when the marine vessel has traveled through all of the plurality of via-points, the marine vessel is decelerated such that the start of deceleration of the marine vessel before passage of the marine vessel through all of the plurality of via-points is significantly reduced or prevented.

In the propulsion system of the marine vessel described above, the controller is preferably configured or programmed to control the propulsion device to decelerate the marine vessel based on the orientation of the marine vessel with respect to the target position when a distance between the target position and the current position of the marine vessel is equal to or less than a first distance threshold. Accordingly, the distance between the target position and the current position of the marine vessel is compared with the first distance threshold such that it is easily determined that the marine vessel has approached the target position. Consequently, a control to decelerate the marine vessel is easily started.

In such a case, the controller is preferably configured or programmed to, when performing a control to decelerate the marine vessel, control the propulsion device to decelerate the marine vessel by a first deceleration degree when the distance is equal to or less than the first distance threshold and greater than a second distance threshold that is less than the first distance threshold, and to decelerate the marine vessel by a second deceleration degree that is larger than the first deceleration degree when the distance is equal to or less than the second distance threshold. Accordingly, when the control to decelerate the marine vessel is started and the distance between the target position and the current position of the marine vessel is relatively large, the marine vessel is decelerated by the relatively small first deceleration degree. Consequently, when the control to decelerate the marine vessel is started, an increase in an inertial force caused by the deceleration and applied to the user on the marine vessel is significantly reduced or prevented. When the control to decelerate the marine vessel is started and the distance between the target position and the current position of the marine vessel becomes relatively small, the marine vessel is sufficiently decelerated by the relatively large second deceleration degree.

In the propulsion system of the marine vessel in which when the distance between the target position and the current position of the marine vessel is equal to or less than the second distance threshold, the marine vessel is decelerated by the second deceleration degree, the controller is preferably configured or programmed to control the propulsion device to maintain a speed of the marine vessel constant or substantially constant when the distance is equal to or less than a third distance threshold that is less than the second distance threshold and greater than a fourth distance threshold that is less than the third distance threshold, and to decelerate the marine vessel and cause the marine vessel to reach the target position when the distance is equal to or less than the fourth distance threshold. Accordingly, after the marine vessel is decelerated, the marine vessel approaches the target position without rapidly changing the speed of the marine vessel. For example, when the marine vessel is used for fishing, escape of fish due to waves or sounds caused by a change in the speed of the marine vessel is significantly reduced or prevented.

In the propulsion system of the marine vessel in which when the distance between the target position and the current position of the marine vessel is equal to or less than the first distance threshold, the marine vessel is decelerated based on the orientation of the marine vessel with respect to the target position, the controller is preferably configured or programmed to perform a control to acquire a current speed of the marine vessel and acquire the first distance threshold, which is a distance threshold to start a control to decelerate the marine vessel, based on a map in which information about the first distance threshold and information about a speed of the marine vessel are associated with each other, and the current speed of the marine vessel. When the speed of the marine vessel is relatively high, a distance required to sufficiently decelerate the marine vessel conceivably becomes large. When the speed of the marine vessel is relatively low, the distance required to sufficiently decelerate the marine vessel conceivably becomes small. In view of this, the first distance threshold, which is the distance threshold to start the control to decelerate the marine vessel is acquired based on the map and the current speed of the marine vessel such that deceleration of the marine vessel is started from an appropriate position of the marine vessel for the current speed of the marine vessel. Furthermore, the map is used such that it is not necessary for the controller to perform a relatively complex calculation in order to acquire the first distance threshold. Consequently, the control burden on the controller is reduced.

In the propulsion system of the marine vessel in which when the distance between the target position and the current position of the marine vessel is equal to or less than the first distance threshold, the marine vessel is decelerated based on the orientation of the marine vessel with respect to the target position, the controller is preferably configured or programmed to, when the controller performs a control to decelerate the marine vessel and the target position is changed to a new target position, control the propulsion device to not accelerate the marine vessel when a distance between the new target position and the current position of the marine vessel is greater than the first distance threshold, and is preferably configured or programmed to control the propulsion device to decelerate the marine vessel based on the orientation of the marine vessel with respect to the target position when the distance between the new target position and the current position of the marine vessel is equal to or less than the first distance threshold. Accordingly, acceleration of the marine vessel is significantly reduced or prevented when a new target position is set while the marine vessel is decelerating. Consequently, repeated acceleration and deceleration of the marine vessel is significantly reduced or prevented, and thus when the marine vessel is used for fishing, for example, escape of fish due to waves or sounds caused by a change in the speed of the marine vessel is effectively significantly reduced or prevented.

The propulsion system of the marine vessel in which the plurality of via-points are acquired preferably further includes a course determiner to determine the plurality of via-points and the target position, and the controller is preferably configured or programmed to, when performing a control to decelerate the marine vessel, control the course determiner to cancel at least one of the plurality of via-points or the target position, or continue the control to decelerate the marine vessel even when at least one of the plurality of via-points or the target position is changed by the course determiner. Accordingly, at least one of the plurality of via-points or the target position is canceled such that the marine vessel is decelerated without any operation by the user to decelerate the marine vessel even when the controller is not able to easily acquire the orientation of the marine vessel with respect to the target position and the current position of the marine vessel with respect to the target position.

The propulsion system of the marine vessel described above preferably further includes a shift actuator to change a shift position of the propulsion device, and an operation lever to operate the shift actuator and change a propulsive force of the propulsion device, and the controller is preferably configured or programmed to perform a fixed point holding control to hold a position of the marine vessel at the target position based on the shift position being moved from a forward movement position to a neutral position by the operation lever when performing a control to decelerate the marine vessel. Accordingly, the user operates the operation lever such that the shift position becomes the neutral position such that the marine vessel is held at the target position.

The propulsion system of the marine vessel described above preferably further includes a shift actuator to change a shift position of the propulsion device, and the controller is preferably configured or programmed to control the shift actuator to change the shift position from a forward movement position to a neutral position when the marine vessel reaches the target position. Accordingly, after the marine vessel reaches the target position, movement of the marine vessel away from the target position due to the propulsive force of the propulsion device is significantly reduced or prevented.

The propulsion system of the marine vessel described above preferably further includes an operation lever to change a propulsive force of the propulsion device, and the controller is preferably configured or programmed to perform a control to start a deceleration mode to decelerate the marine vessel based on the orientation of the marine vessel with respect to the target position and the current position of the marine vessel with respect to the target position, and cancel the deceleration mode based on an operation performed on the operation lever by an operator when performing a control to decelerate the marine vessel in the deceleration mode. Accordingly, even when a control to decelerate the marine vessel is performed in the deceleration mode, the deceleration mode is canceled according to the intention of the user.

The propulsion system of the marine vessel described above preferably further includes a steering wheel to steer the marine vessel, and the controller is preferably configured or programmed to switch, based on an operation performed on the steering wheel by an operator, a control to automatically steer the marine vessel to a control based on the operation on the steering wheel when performing a control to decelerate the marine vessel. Accordingly, even when the control to automatically steer the marine vessel is performed, the marine vessel is steered according to the intention of the user while the marine vessel is decelerated.

In the propulsion system of the marine vessel described above, the controller is preferably configured or programmed to control the propulsion device to decelerate the marine vessel when not acquiring the target position. Accordingly, even when the controller does not acquire the target position, the marine vessel is decelerated without an operation by the user to decelerate the marine vessel.

The propulsion system of the marine vessel described above preferably further includes a sensor to detect at least one of the current position of the marine vessel or the orientation of the marine vessel, and the controller is preferably configured or programmed to control the propulsion device to decelerate the marine vessel when acquiring information about an abnormality of the sensor. Accordingly, even when it is not easy to continue the control to automatically steer the marine vessel due to the abnormality in the sensor, the marine vessel is decelerated without any operation by the user to decelerate the marine vessel.

The propulsion system of the marine vessel described above preferably further includes a display provided on the marine vessel, and the controller is preferably configured or programmed to control the propulsion device to decelerate the marine vessel based on the orientation of the marine vessel with respect to the target position and the current position of the marine vessel with respect to the target position, and control the display to provide a display indicating that the marine vessel is decelerating. Accordingly, the user on the marine vessel visually recognizes that the marine vessel is decelerating.

A propulsion control method of a marine vessel according to a preferred embodiment of the present invention includes acquiring a target position of the marine vessel, a current position of the marine vessel, and an orientation of the marine vessel; automatically steering the marine vessel based on the target position, the current position of the marine vessel, and the orientation of the marine vessel that have been acquired; and decelerating the marine vessel based on the orientation of the marine vessel with respect to the target position and the current position of the marine vessel with respect to the target position.

In the propulsion control method of the marine vessel described above, when the marine vessel is automatically moved toward the target position, the work burden on the user is reduced, similarly to the propulsion system of the marine vessel described above.

In the propulsion control method of the marine vessel described above, the decelerating of the marine vessel preferably includes decelerating the marine vessel based on the current position of the marine vessel with respect to the target position when a relative angle of the orientation of the marine vessel with respect to a direction from the marine vessel toward the target position is within an angle threshold range. Accordingly, when the relative angle of the orientation of the marine vessel is within the angle threshold range and the orientation of the marine vessel is facing the target position, the marine vessel is decelerated. Consequently, the marine vessel is decelerated while approaching the target position, and thus the marine vessel is moved to the target position or the vicinity of the target position while passage of the marine vessel through the target position is significantly reduced or prevented.

The propulsion control method of the marine vessel described above preferably further includes acquiring a plurality of via-points through which the marine vessel travels, and the decelerating of the marine vessel preferably includes decelerating the marine vessel based on the orientation of the marine vessel with respect to the target position and the current position of the marine vessel with respect to the target position when the marine vessel has traveled through all of the plurality of via-points. Accordingly, the start of deceleration of the marine vessel before passage of the marine vessel through all of the plurality of via-points is significantly reduced or prevented.

In the propulsion control method of the marine vessel described above, the decelerating of the marine vessel preferably includes decelerating the marine vessel based on the orientation of the marine vessel with respect to the target position when a distance between the target position and the current position of the marine vessel is equal to or less than a first distance threshold. Accordingly, the distance between the target position and the current position of the marine vessel is compared with the first distance threshold such that it is easily determined that the marine vessel has approached the target position. Consequently, a control to decelerate the marine vessel is easily started.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8A is a schematic view illustrating a case in which the conditions for starting a deceleration control according to the first preferred embodiment of the present invention are satisfied.

FIG. 8B is a schematic view illustrating a case in which the conditions regarding a current orientation with respect to a target position according to the first preferred embodiment of the present invention are not satisfied.

FIG. 8C is a schematic view illustrating a case in which the conditions regarding a current position with respect to the target position according to the first preferred embodiment of the present invention are not satisfied.

FIG. 9 is a diagram illustrating the structure of a map according to the first preferred embodiment of the present invention.

FIG. 13 is a diagram illustrating a case in which the target position is changed according to the first preferred embodiment of the present invention.

FIG. 14A is a diagram illustrating cancellation of a deceleration control according to the first preferred embodiment of the present invention.

FIG. 14B is a diagram illustrating cancellation of a track point control according to the first preferred embodiment of the present invention.

DETAILED DESCRIPTION OF THE PREFERRED EMBODIMENTS

Preferred embodiments of the present invention are hereinafter described with reference to the drawings.

First Preferred Embodiment

The structure of a marine vessel 100 (propulsion system 10) according to a first preferred embodiment of the present invention is now described with reference to FIGS. 1 to 14. In the figures, arrow FWD represents the forward movement direction of the marine vessel 100, and arrow BWD represents the reverse movement direction of the marine vessel 100.

Figure 1:
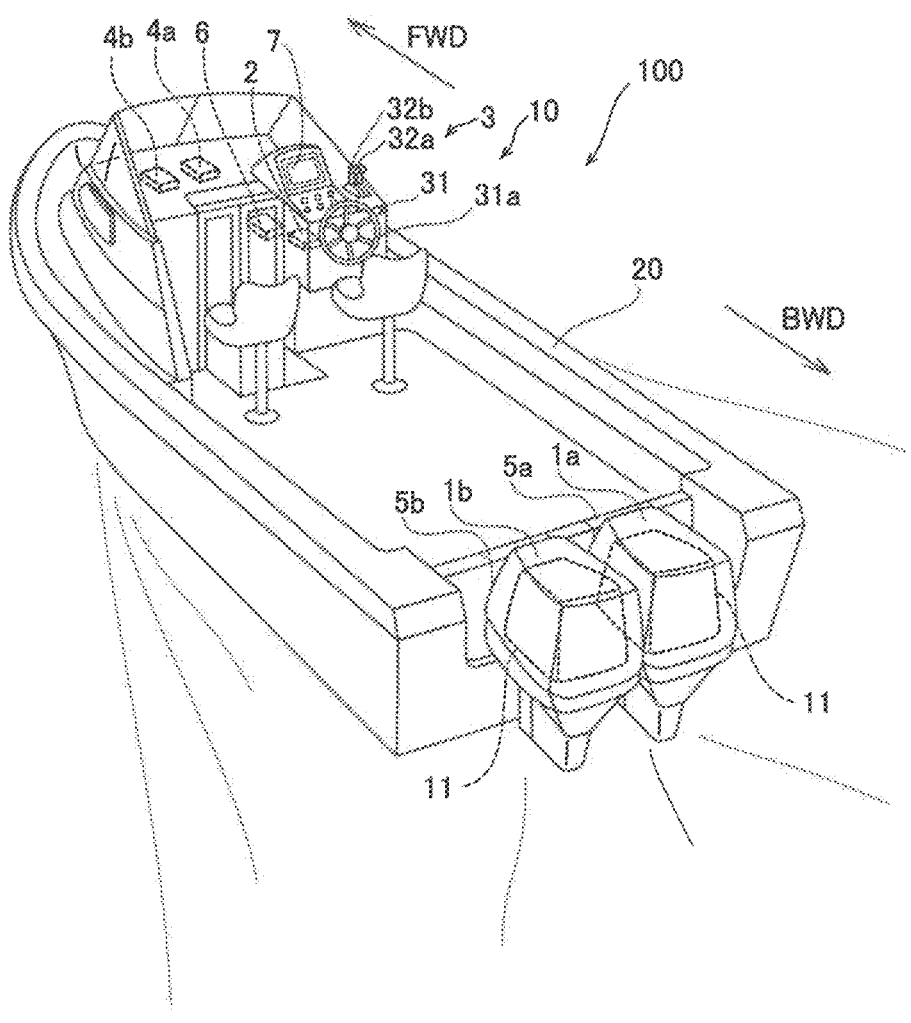
FIG. 1 is a perspective view schematically showing a marine vessel including outboard motors according to a first preferred embodiment of the present invention.

As shown in FIG. 1, the marine vessel 100 includes the propulsion system 10 and a hull 20. The propulsion system 10 propels the marine vessel 100. Furthermore, the propulsion system 10 steers the marine vessel 100. The propulsion system 10 includes outboard motors 1a and 1b, a boat control unit (BCU) 2, a remote control 3, a global positioning system (GPS) device 4a, an electronic compass 4b, steerings 5a and 5b, a storage 6, and a navigation information display 7. That is, the marine vessel 100 according to the first preferred embodiment is an outboard motor boat. The outboard motors 1a and 1b are examples of a "propulsion device". The BCU 2 is an example of a "controller".

Figure 2:
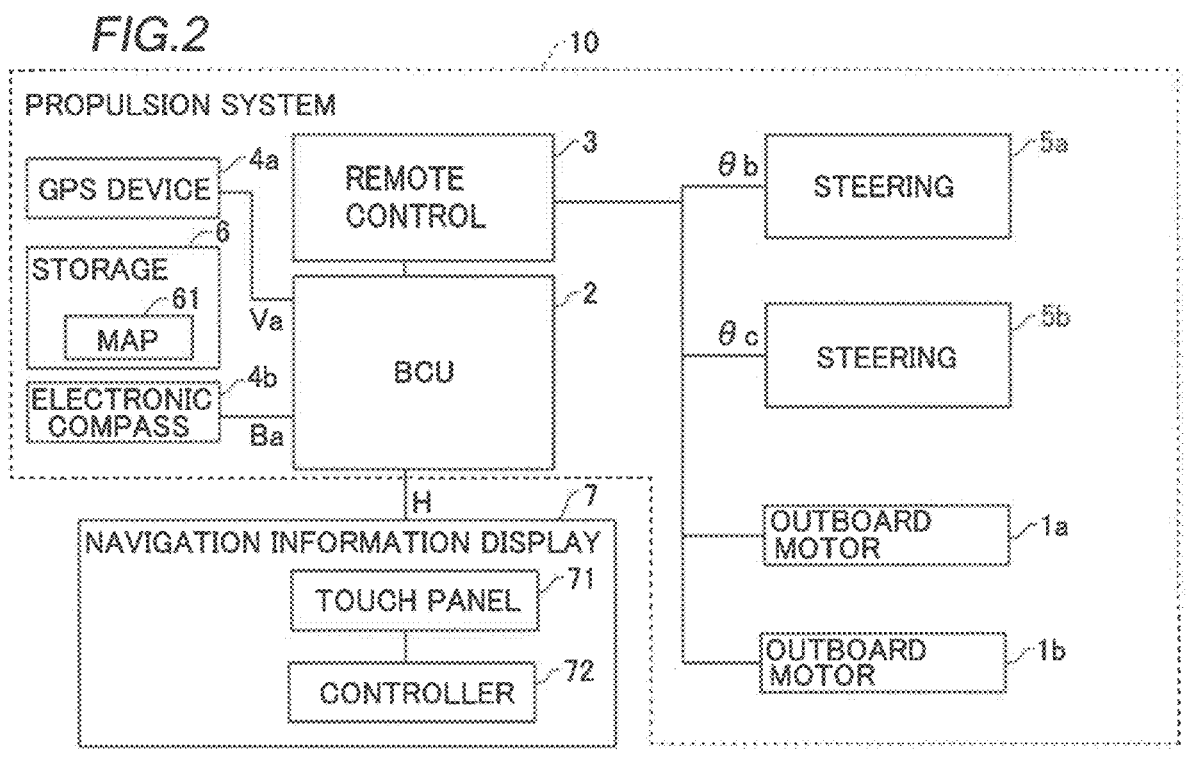
FIG. 2 is a block diagram showing the structure of a propulsion system and a navigation information display according to the first preferred embodiment of the present invention.

As shown in FIG. 2, the GPS device 4a transmits information about the detected current position Pa of the marine vessel 100 (hull 20) and information about the current speed Va of the marine vessel 100 to the BCU 2. The electronic compass 4b transmits information about the detected current orientation Ba of the marine vessel 100 (hull 20) to the BCU 2. The navigation information display 7 acquires the information about the current position Pa and the information about the current speed Va from the GPS device 4a of the propulsion system 10. Furthermore, the navigation information display 7 acquires the information about the current orientation Ba from the electronic compass 4b of the propulsion system 10. The navigation information display 7 includes a touch panel 71 and a controller 72. In this specification, the "orientation of the marine vessel" is preferably a course orientation that is the direction of the course of the marine vessel. In this specification, the "orientation of the marine vessel" is not limited to the course orientation, but may be a bow orientation that is the direction of the bow of the hull 20.

The BCU 2 includes a control circuit for the marine vessel 100 including a central processing unit (CPU), for example. The BCU 2 is configured or programmed to perform a control to automatically steer the marine vessel 100 and a control to automatically change the propulsive forces P of the outboard motors 1a and 1b. The BCU 2 may be configured or programmed to perform each control process by executing a program (software) stored in a memory (not shown), or may be configured or programmed to perform the control process as hardware (circuit structure).

Figure 3:
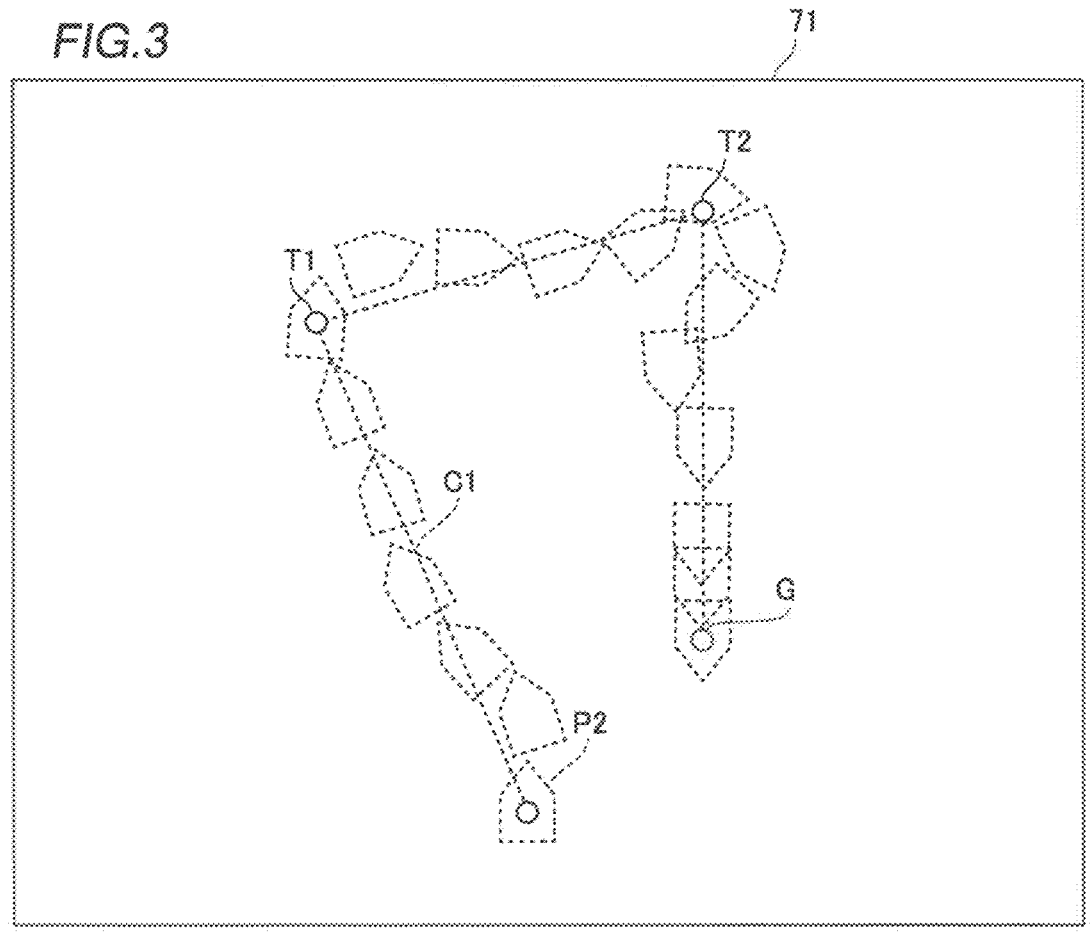
FIG. 3 is a diagram illustrating the structure of the navigation information display according to the first preferred embodiment of the present invention.

As shown in FIG. 3, the touch panel 71 provides a display of a planned course C1 that is a route along which the marine vessel 100 is scheduled to travel, a display of a plurality of planned via-points T (via-points T1 and T2 in FIG. 3) through which the marine vessel 100 travels, a display of a target position G that is a scheduled position that the marine vessel 100 finally reaches, and a display of a current position indicating the current position of the marine vessel 100, for example. The controller 72 transmits course information H including information about the planned course, information about the via-points T, and information about the target position G to the BCU 2 of the propulsion system 10. The navigation information display 7 is a so-called multifunction display. The navigation information display 7 is an example of a "course determiner". The touch panel 71 is an example of a "display".

Figure 4:
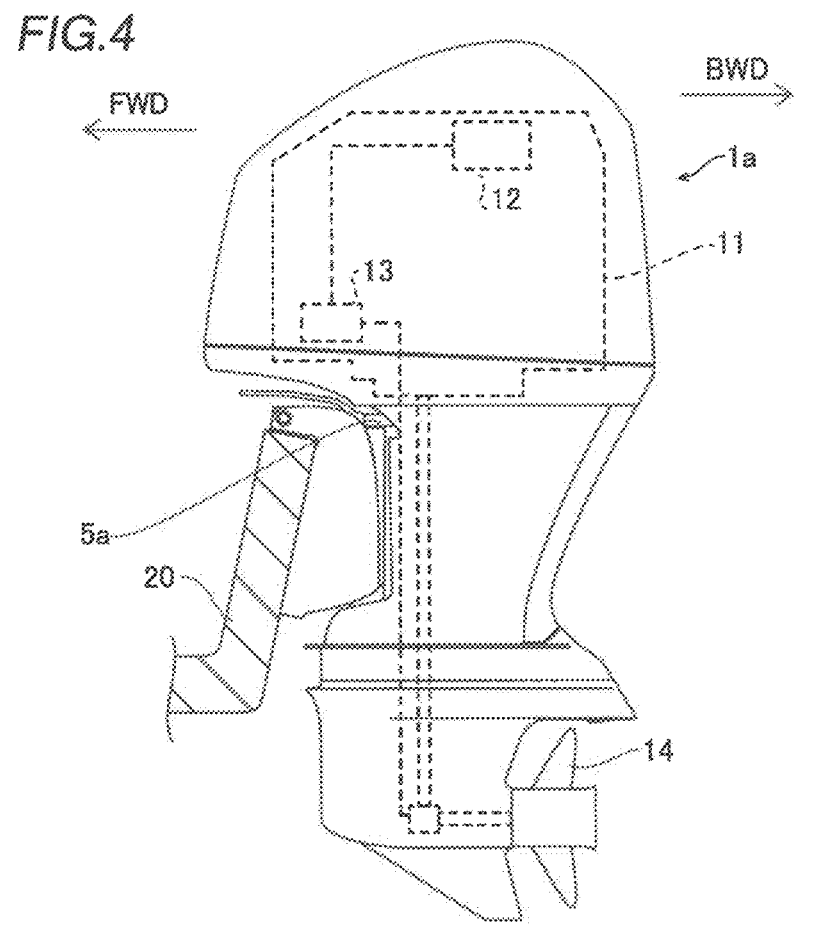
FIG. 4 is a block diagram showing the structure of a marine vessel maneuvering apparatus according to the first preferred embodiment of the present invention.

As shown in FIG. 4, each of the outboard motors 1a and 1b (see FIG. 1) is attached to a rear portion of the hull 20. The outboard motor 1a includes an engine 11, an engine control unit (ECU) 12, a shift actuator 13, and a propeller 14. The outboard motor 1b has the same or similar structure as the outboard motor 1a. The engine 11 is an internal combustion engine, for example. The engine 11 generates a driving force by combustion of fuel. The engine 11 rotates a crankshaft by the generated driving force. When the crankshaft is rotated, the propeller 14 of the outboard motor 1a is rotated. A propulsive force P is generated by the rotation of the propeller 14, and the hull 20 moves. The shift actuator 13 moves the shift position of the outboard motor 1a to any one of a forward movement position F, a neutral position N, and a reverse movement position R based on an operation performed on an operation lever 32a described below. Thus, when the engine 11 is being driven and the shift position of the outboard motor 1a is at the forward movement position F, the hull 20 moves forward. When the engine 11 is being driven and the shift position of the outboard motor 1a is at the reverse movement position R, the hull 20 moves rearward. When the engine 11 is being driven and the shift position of the outboard motor 1a is at the neutral position N, no propulsive force P is generated for the hull 20.

The ECU 12 controls driving of the engine 11 and driving of the shift actuator 13 based on a command from the propulsion system 10. For example, the ECU 12 performs each control process by executing a program stored in the memory.

Figure 5:
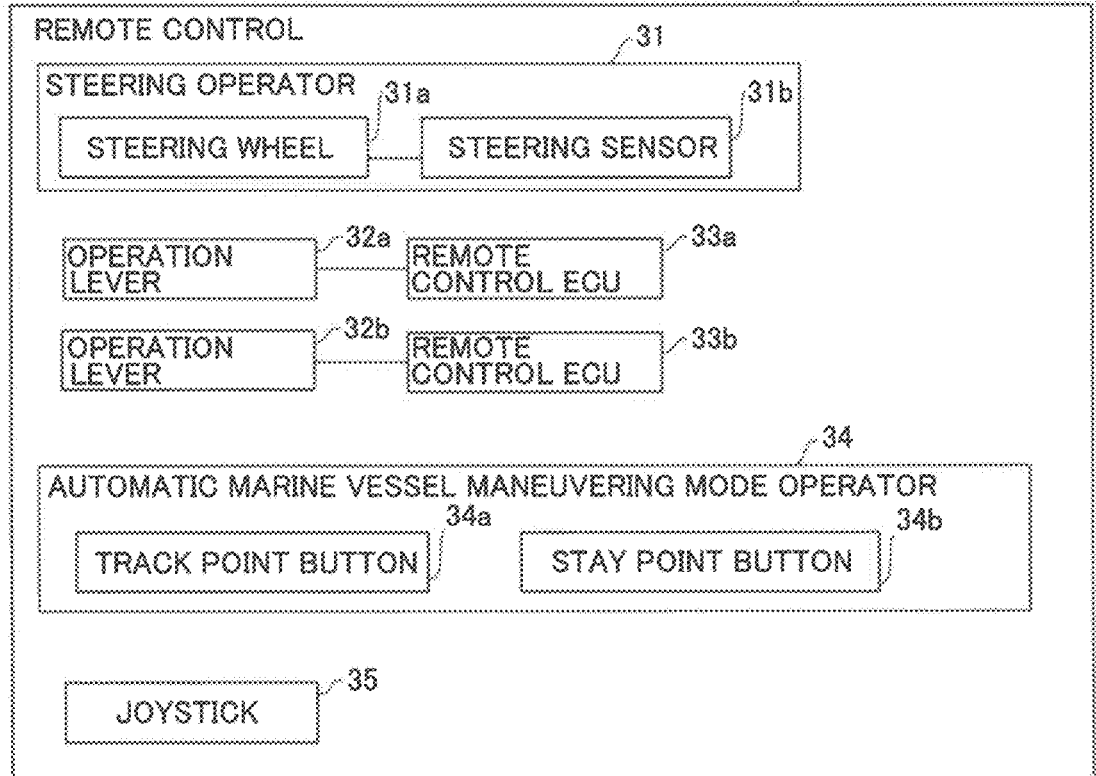
FIG. 5 is a block diagram showing the structure of a marine vessel maneuvering apparatus according to the first preferred embodiment of the present invention.

As shown in FIG. 5, the remote control 3 operates the outboard motors 1a and 1b and the steerings 5a and 5b. Specifically, the remote control 3 includes a steering operator 31, operation levers 32a and 32b, remote control ECUs 33a and 33b, an automatic marine vessel maneuvering mode operator 34, and a joystick 35.

The steering operator 31 provides information about the steering angles θ of the steerings 5a and 5b that steer the marine vessel 100. Specifically, the steering operator 31 includes a steering wheel 31a and a steering sensor 31b. The steering wheel 31a is rotatable while being gripped by an operator. The steering sensor 31b acquires the rotation angle of the steering wheel 31a and transmits the rotation angle to the BCU 2.

The operation lever 32a provides information about the propulsive force P of the outboard motor 1a via the remote control ECU 33a. The operation lever 32b provides the propulsive force P of the outboard motor 1b via the remote control ECU 33b. The operating lever 32b has the same or similar structure as the operating lever 32a.

Figure 6:
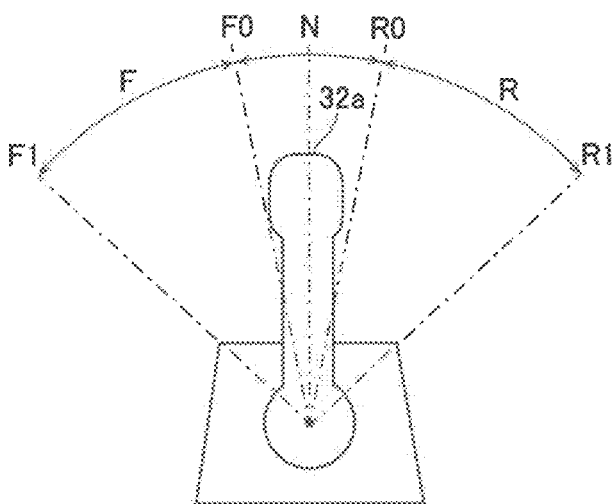
FIG. 6 is a schematic view illustrating the structure of an operation lever according to the first preferred embodiment of the present invention.

As shown in FIG. 6, the operation lever 32a is located at any of the forward movement position F, the neutral position N, and the reverse movement position R. For example, the operation lever 32a is rotated (tilted) while being gripped by the operator. The operation lever 32a is rotated to move between the forward movement position F, the neutral position N, and the reverse movement position R. Furthermore, the operation lever 32a outputs a command signal to increase the forward propulsive force P as the operation lever 32a is rotated forward (toward F1). The operation lever 32a outputs a command signal to increase the rearward propulsive force P as the operation lever 32a is rotated rearward (toward R1). The operation lever 32a outputs a command signal indicating that the operation lever 32a is located at the neutral position N, with a position between a position F0 and a position R0 as the neutral position N. The remote control ECU 33a transmits a command signal to each of the ECU 12 of the outboard motor 1a and the BCU 2. The remote control ECU 33b transmits a command signal to each of the ECU 12 of the outboard motor 1b and the BCU 2.

The automatic marine vessel maneuvering mode operator 34 transmits a command signal to start an autopilot control such as a track point control or a fixed point holding control to the BCU 2 when operated by the operator. Specifically, as shown in FIG. 5, the automatic marine vessel maneuvering mode operator 34 includes a track point button 34a and a stay point button 34b.

When a joystick operation control, which is a mode to control the operation of the marine vessel 100 based on an operation on the joystick 35, is performed, the propulsive forces and the steering angles θ of the outboard motors 1a and 1b are changed based on the operation amount of the joystick 35. That is, when the joystick operation control is being performed, the BCU 2 determines a throttle opening degree Vc and steering angle command values θb and θc based on the operation amount of the joystick 35. Furthermore, the joystick 35 changes a position at which the marine vessel 100 is held when the fixed point holding control is being performed by the BCU 2. That is, the BCU 2 changes the position at which the marine vessel 100 is held (predetermined position) based on an operation on the joystick 35.

Figure 7:
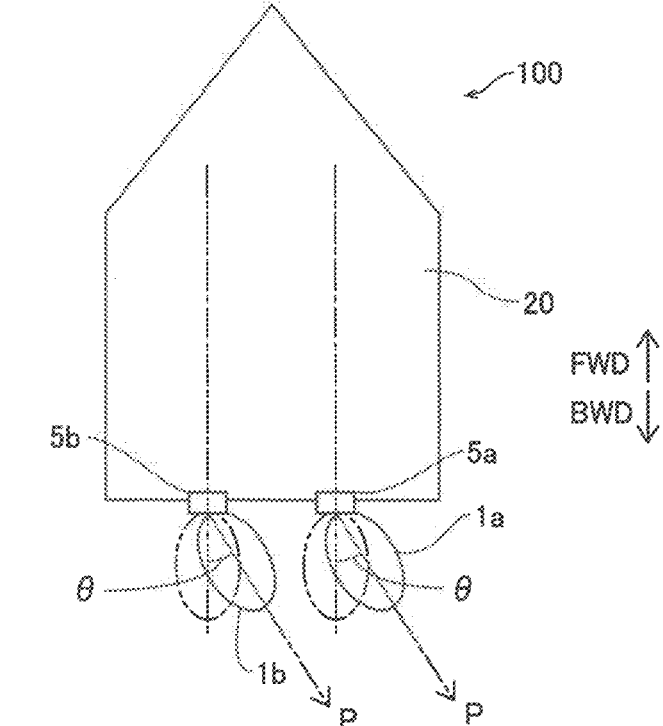
FIG. 7 is a schematic view illustrating the steering angle of the marine vessel according to the first preferred embodiment of the present invention.

As shown in FIG. 7, the steering 5a changes the direction (steering angle θ) of the outboard motor 1a with respect to the hull 20 based on the steering angle command value θb transmitted from the BCU 2 and the remote control 3. Thus, the marine vessel 100 (hull 20) is steered. Furthermore, the steering 5b changes the direction of the outboard motor 1b with respect to the hull 20 based on the steering angle command value θc. The steering 5b steers the marine vessel 100 (hull 20) by changing the direction of the outboard motor 1b with respect to the hull 20.

The BCU 2 performs the track point control when the track point button 34a is operated (pressed, for example) and the course information H is acquired from the navigation information display 7. As shown in FIG. 3, the track point control refers to a control to move the hull 20 such that the hull 20 sequentially passes through each of the via-points T1 and T2. The BCU 2 performs the fixed point holding control (stay point control) when the stay point button 34b is operated (pressed, for example). The fixed point holding control refers to a control to hold the position of the hull 20 at a predetermined position. Furthermore, the BCU 2 acquires the information about the current position Pa and the information about the current speed Va from the GPS device 4a and acquires the information about the current orientation Ba from the electronic compass 4b in order to perform the track point control and the fixed point holding control.

The BCU 2 sets at least one of a target steering angle θa and a target speed Vb. The BCU 2 acquires a current target steering angle θa from the remote control 3 and controls the operation of the steerings 5a and 5b such that the steering angles θ of the steerings 5a and 5b become the target steering angle θa. Furthermore, the BCU 2 controls the operation of the outboard motors 1a and 1b such that the speed of the marine vessel 100 becomes the target speed Vb (performs a feedback control of the throttle opening degree Vc using the target speed Vb) when a deceleration control during the track point control described below, the joystick operation control, or the fixed point holding control is performed.

Specifically, the BCU 2 determines the steering angle command values θb and θc based on the target steering angle θa. The BCU 2 transmits the determined steering angle command value θb to the steering 5a via the remote control 3, and transmits the determined steering angle command value θc to the steering 5a via the remote control 3. Furthermore, the BCU 2 determines the throttle opening degree Vc of the engine 11 based on the current speed Va and the target speed Vb in order to control the propulsive force P.

The BCU 2 is configured or programmed to transmit information about the throttle opening degree Vc to the ECU 12 via the remote control 3. The BCU 2 is configured or programmed to control the engine 11 based on the information about the throttle opening degree Vc via the remote control 3 and the ECU 12. That is, the BCU 2 is configured or programmed to perform a feedback control on the steering angle command values θb and θc and the throttle opening degree Vc. The "speed V" is a ground speed (vessel speed) at which the hull 20 is traveling, for example. The "speed V" is not limited to the vessel speed, but may be a "speed V" estimated (calculated) based on the engine speed. The steering angle command values θb and θc are different values at the start of the joystick operation control and the fixed point holding control, for example. The steering angle command values θb and θc are not limited to different values, but may be the same value.

In the first preferred embodiment, the BCU 2 is configured or programmed to control the outboard motors 1a and 1b so as to decelerate the marine vessel 100 that is in motion based on the current orientation Ba of the marine vessel 100 with respect to the target position G and the current position Pa of the marine vessel 100 with respect to the target position G. In the following description, controlling the outboard motors 1a and 1b so as to decelerate the marine vessel 100 in motion during the track point control (deceleration mode) is described simply as a "deceleration control". The BCU 2 starts the deceleration control when the conditions regarding passage of the via-points T, the conditions regarding the current orientation Ba with respect to the target position G, and the conditions regarding the current position Pa with respect to the target position G are satisfied.

The BCU 2 determines whether or not the marine vessel 100 has traveled through all of a plurality of via-points T. The fact that the marine vessel 100 has traveled through all of the plurality of via-points T indicates that the conditions regarding passage of the via-points have been satisfied. For example, when the BCU 2 acquires the information about the via-points T1 and T2 and the information about the target position G from the navigation information display 7, the BCU 2 determines whether or not the marine vessel 100 has traveled through the via-points T1 and T2. In other words, the BCU 2 determines whether or not the next point to which the marine vessel 100 heads is the target position G. In the first preferred embodiment, when the marine vessel 100 has traveled through all of the plurality of via-points T, and the conditions regarding the current orientation Ba with respect to the target position G and the conditions regarding the current position Pa with respect to the target position G are satisfied, the BCU 2 starts the deceleration control.

As shown in FIGS. 8A to 8C, the BCU 2 determines whether or not the relative angle φ of the current orientation Ba of the marine vessel 100 with respect to a direction A2 from the marine vessel 100 toward the target position G is within an angle threshold range J. The fact that the relative angle φ is within the angle threshold range J indicates that the conditions regarding the current orientation Ba with respect to the target position G have been satisfied. For example, the angle threshold range J is set to a range up to 90 degrees or a range up to a predetermined value less than 90 degrees with respect to the bow direction A1 of the hull 20. That is, it is determined whether or not the marine vessel 100 is facing the target position G. When the relative angle φ is within the angle threshold range J, the BCU 2 starts the deceleration control based on the current position Pa of the marine vessel 100 with respect to the target position G. FIGS. 8A and 8C show an example in which the relative angle φ is within the angle threshold range J. FIG. 8B shows an example in which the relative angle φ is outside the angle threshold range J.

The BCU 2 determines whether or not a distance D between the target position G and the current position Pa is equal to or less than a start distance threshold Dt1. The start distance threshold Dt1 refers to a distance threshold at which the deceleration control is started. The fact that the distance D is equal to or less than the start distance threshold Dt1 indicates that the conditions regarding the current position Pa with respect to the target position G have been satisfied. FIGS. 8A and 8B show an example in which the distance D is equal to or less than the start distance threshold Dt1. FIG. 8C shows an example in which the distance D is greater than the start distance threshold Dt1. The starting distance threshold Dt1 is an example of a "first distance threshold".

As shown in FIG. 9, the BCU 2 acquires the start distance threshold Dt1 based on a map 61 and the current speed Va. The map 61 is data in which information about the start distance threshold Dt1 and information about the current speed Va of the marine vessel 100 are associated with each other. For example, in the map 61, as the current speed Va increases, the start distance threshold Dt1 is set to a larger value. Furthermore, in the map 61, the current speed Va and the start distance threshold Dt1 are associated with each other so as to have a linear or substantially linear function relationship. The lower limit value Dta of the start distance threshold Dt1 is greater than 0. That is, when the distance D is equal to or less than the lower limit value Dta, the conditions regarding the current position Pa with respect to the target position G are satisfied regardless of the current speed Va.

The deceleration control by the BCU 2 is now described with reference to FIGS. 10 to 12. The BCU 2 automatically controls the propulsive forces P of the outboard motors 1a and 1b and the steering angle θ of the steerings 5a and 5b, and performs the deceleration control to cause the marine vessel 100 to reach the target position G while reducing the speed V of the marine vessel 100. The BCU 2 controls the maximum value of the throttle opening degree Vc (throttle command value) to be a value at the start of the deceleration control while performing the deceleration control.

Figure 10:
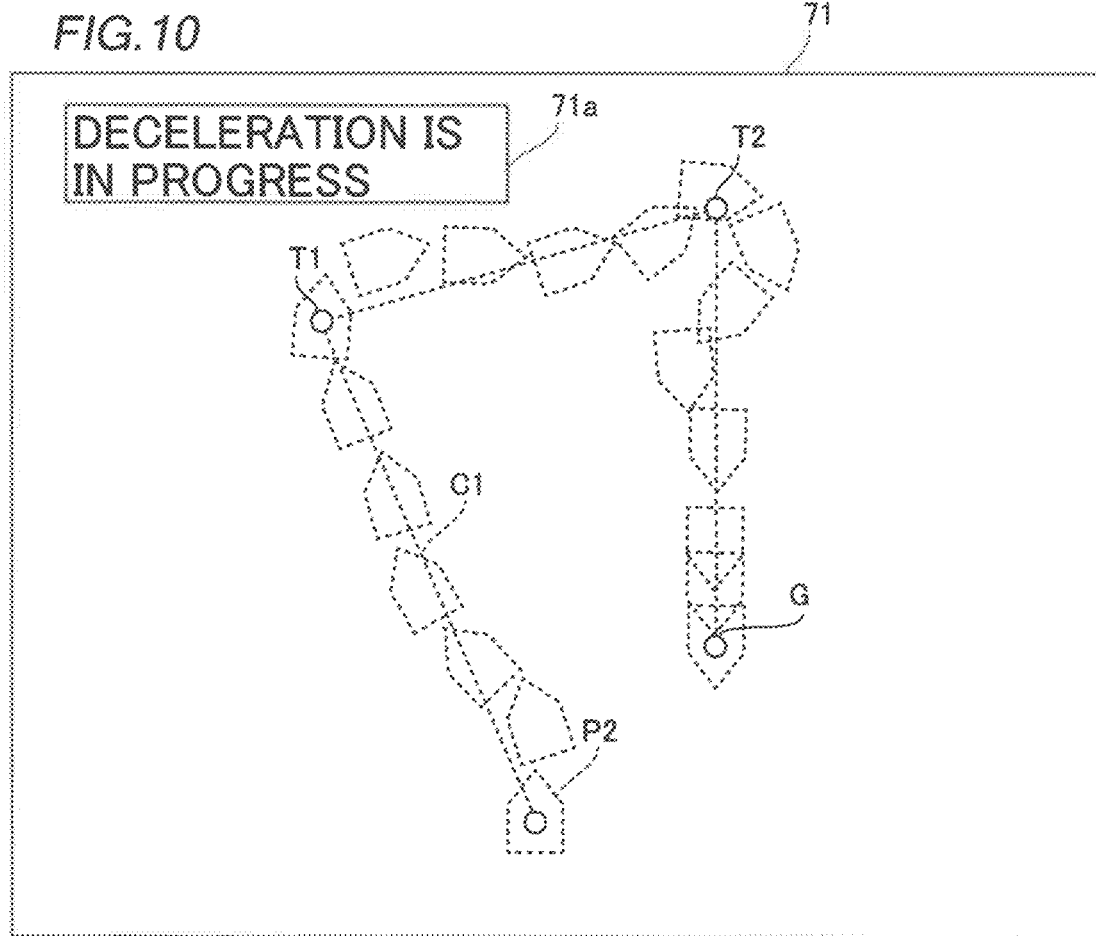
FIG. 10 is a diagram illustrating a display indicating that deceleration is in progress according to the first preferred embodiment of the present invention.

As shown in FIG. 10, the BCU 2 controls the touch panel 71 to provide a display 71a indicating that the marine vessel 100 is decelerating during a deceleration control period. That is, the navigation information display 7 displays, on the touch panel 71, the display 71a indicating that the marine vessel 100 is decelerating based on acquisition of a signal indicating that the deceleration control is being performed from the BCU 2.

Figure 11:
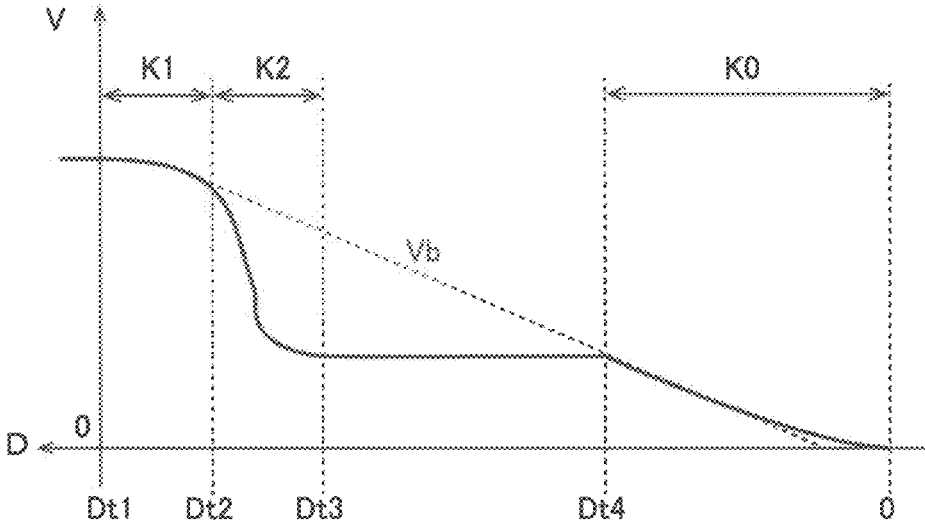
FIG. 11 is a diagram illustrating the relationship between a distance between the target position and the current position and a deceleration rate according to the first preferred embodiment of the present invention.
Figure 12:
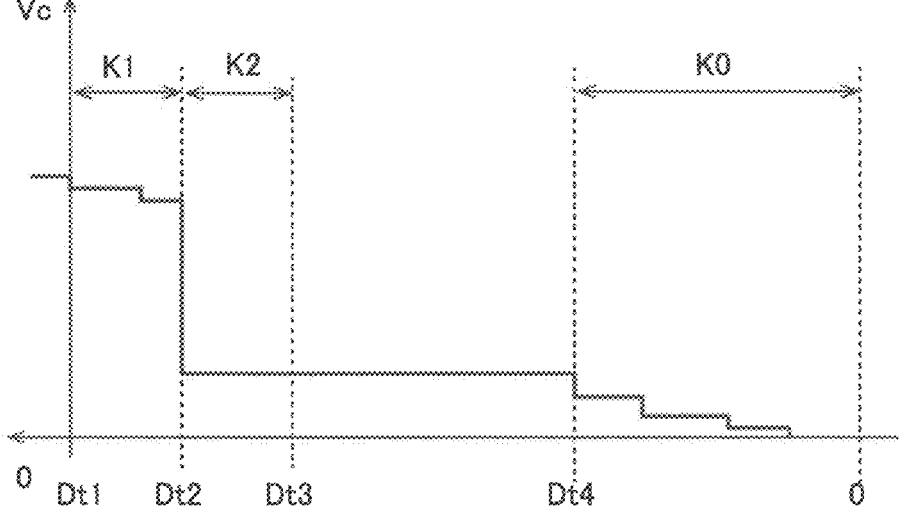
FIG. 12 is a diagram illustrating the relationship between the distance between the target position and the current position and a throttle opening degree according to the first preferred embodiment of the present invention.

As shown in FIG. 11, when the deceleration control is performed, the distance D is equal to or less than the start distance threshold Dt1, and the distance D is greater than a slow deceleration end threshold Dt2, the BCU 2 decelerates (slowly decelerates) the marine vessel 100 by a deceleration degree K1. The slow deceleration end threshold Dt2 is less than the start distance threshold Dt1. The "deceleration degree" refers to the magnitude of deceleration per unit time. The deceleration degree K1 is smaller than a deceleration degree K0 of the target speed Vb. Specifically, as shown in FIG. 12, the throttle opening degree Vc is adjusted. A slow deceleration region refers to a region that is equal to or less than the start distance threshold Dt1 and greater than the slow deceleration end threshold Dt2. The slow deceleration end threshold Dt2 is an example of a "second distance threshold".

As shown in FIG. 11, the BCU 2 decelerates the marine vessel 100 by a deceleration degree K2 when the deceleration control is performed, the distance D is equal to or less than the slow deceleration end threshold Dt2, and the distance D is greater than a semi-planing distance threshold Dt3. The semi-planing distance threshold Dt3 is less than the slow deceleration end threshold Dt2. The deceleration degree K2 is smaller than the deceleration degree K1. Furthermore, the deceleration degree K2 is larger than the deceleration degree K0. At this time, the marine vessel 100 navigates in a semi-planing condition. The "semi-planing condition" refers to a condition in which only a bow portion is lifted due to the resistance of water. The semi-planing distance threshold Dt3 is an example of a "third distance threshold".

The BCU 2 maintains the speed Va of the marine vessel 200 constant or substantially constant when the distance D is equal to or less than the semi-planing distance threshold Dt3 and the distance D is greater than a constant speed distance threshold Dt4. In other words, when the distance D is equal to or less than the semi-planing distance threshold Dt3 and the distance D is greater than the constant speed distance threshold Dt4, the deceleration degree substantially 0. For example, after the speed Va of the marine vessel 200 is decelerated to a trolling speed, the marine vessel 100 is moved until the distance D becomes the constant speed distance threshold Dt4 or less while the trolling speed is maintained. The constant speed distance threshold Dt4 is less than the semi-planing distance threshold Dt3. A region in which the marine vessel moves in the semi-planing condition refers to a region in which the distance D is equal to or less than the slow deceleration end threshold Dt2 and is greater than the constant speed distance threshold Dt4. The constant speed distance threshold Dt4 is an example of a "fourth distance threshold".

The BCU 2 controls the outboard motors 1a and 1b such that the marine vessel 100 is decelerated to reach the target position G when the distance D is equal to or less than the constant speed distance threshold Dt4. The region in the vicinity of the target position G refers to a region in which the distance D is equal to or less than the constant speed distance threshold Dt4. Specifically, the BCU 2 decelerates the marine vessel 100 by the deceleration degree K0 when the distance D becomes the constant speed distance threshold Dt4 or less. Then, the BCU 2 determines whether or not the marine vessel 100 has reached the target position G.

As shown in FIG. 13, the BCU 2 continues the deceleration control when the deceleration control is being performed, and at least one of the plurality of via-points T or the target position G is canceled by the navigation information display 7. Furthermore, the BCU 2 continues the deceleration control when the deceleration control is being performed, and at least one of the plurality of via-points T or the target position G is changed by the navigation information display 7.

Specifically, the BCU 2 continues the deceleration control when a distance D1 between a new target position G1 and the current position Pa of the marine vessel is equal to or less than the start distance threshold Dt1. Furthermore, the BCU 2 controls the outboard motors 1a and 1b so as to not accelerate the marine vessel 100 when the distance D1 is greater than the start distance threshold Dt1. That is, when the target position G is changed to G1, the BCU 2 performs a control to maintain the marine vessel 100 at a constant speed V (current speed Va) or decelerate the marine vessel 100 without accelerating the marine vessel 100 even when the distance D1 is greater than the start distance threshold Dt1.

As shown in FIG. 14A, the BCU 2 performs a control to cancel the deceleration control based on operations performed on the operation levers 32a and 32b by the operator when performing the deceleration control. For example, the BCU 2 cancels the deceleration control when the deceleration control is being performed and both the operation levers 32a and 32b are moved from the forward movement positions F to the neutral positions N. Furthermore, the BCU 2 cancels the deceleration control when the deceleration control is being performed and at least one of the operation lever 32a or the operation lever 32b is tilted to the F1 side relative to a position at the start of deceleration control by a predetermined throttle required value (predetermined inclination). After canceling the deceleration control, the BCU 2 controls the propulsive forces (throttle opening degrees Vc) of the outboard motors 1a and 1b based on operations performed on the operation levers 32a and 32b by the operator. That is, after canceling the deceleration control, the BCU 2 accelerates the marine vessel 100 based on the positions of the operation levers 32a and 32b.

As shown in FIG. 14B, the BCU 2 switches a control to automatically steer the marine vessel 100 (track point control) to a control based on an operation performed on the steering wheel 31a by the operator (manual control) based on an operation performed on the steering wheel 31a by the operator when performing the deceleration control. That is, the BCU 2 cancels the track point control when the deceleration control is being performed and the operator operates the steering wheel 31a. Then, the BCU 2 performs a control to steer the marine vessel 100 regardless of the target position G based on the operation performed on the steering wheel 31a by the operator. For example, the BCU 2 cancels the track point control when the rotation speed of the steering wheel 31a is equal to or higher than a predetermined rotation speed.

The BCU 2 performs an emergency deceleration control of the deceleration control when not acquiring the target position G. A case in which the target position G is not acquired includes a case in which the BCU 2 and the navigation information display 7 cannot communicate with each other and a case in which the target position G is canceled by the navigation information display 7. Furthermore, the BCU 2 performs the emergency deceleration control of the deceleration control when information about the abnormality of the GPS device 4a or the electronic compass 4b is acquired. Specifically, in the emergency deceleration control, the BCU 2 decelerates the marine vessel 100 by a deceleration degree K4 that is equal to or larger than the deceleration degree K2. Then, the BCU 2 decelerates the marine vessel 100 until the throttle opening degree Vc of the marine vessel 100 becomes 0 (until the throttle is fully closed).

In the first preferred embodiment, the BCU 2 performs a fixed point holding control to hold the current position Pa of the marine vessel 100 at the target position G based on the operation levers 32a and 32b moved from the forward movement positions F to the neutral positions N when the marine vessel 100 reaches the target position G. That is, the BCU 2 switches the track point control to the fixed point holding control based on the marine vessel 100 that has reached the target position G.

A propulsion control method of the marine vessel 100 according to the first preferred embodiment is now described with reference to FIGS. 15 and 16.

Figure 15:
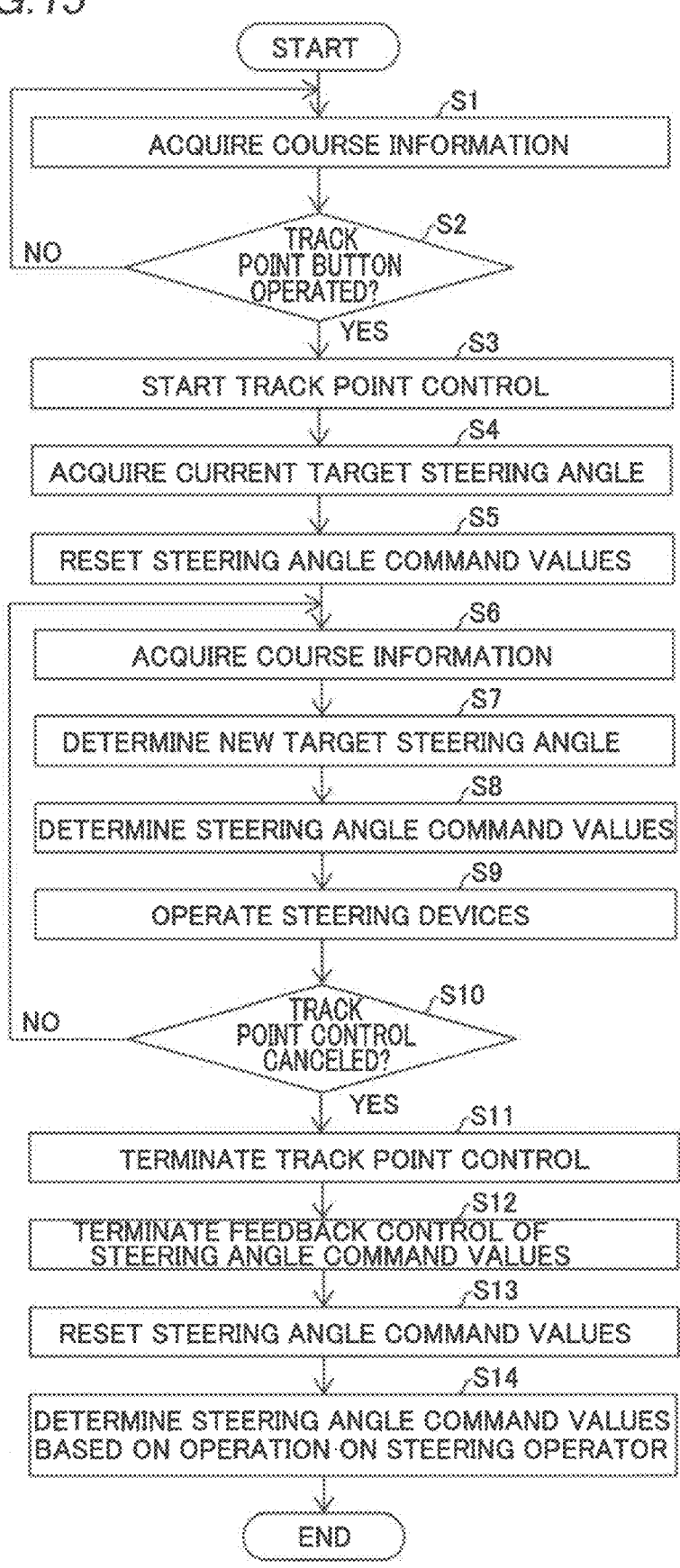
FIG. 15 is a flowchart showing a track point control process according to the first preferred embodiment of the present invention.

FIG. 15 is a flowchart of the track point control of the propulsion system 10. The control process of the propulsion system 10 is performed by the BCU 2.

In step S1, the course information H including the information about the via-points T and the information about the target position G is acquired from the navigation information display 7. Then, the process advances to step S2.

In step S2, it is determined whether or not the track point button 34a has been operated. When the track point button 34a has been operated, the process advances to step S3, and when the track point button 34a has not been operated, the process returns to step S1.

In step S3, the track point control is started. Then, the process advances to step S4.

In step S4, the current target steering angle θa is acquired. Specifically, the current target steering angle θa detected by the remote control 3 is acquired. Then, the process advances to step S5.

In step S5, the steering angle command values θb and θc are reset. Then, the process advances to step S6.

In step S6, the course information H including the information about the via-points T and the information about the target position G is acquired from the navigation information display 7. Then, the process advances to step S7.

In step S7, a new target steering angle θa is determined. That is, a new target steering angle θa is determined based on the course information H acquired from the navigation information display 7, the information about the current position Pa, and the current orientation Ba. Then, the process advances to step S8.

In step S8, the steering angle command values θb and θc are determined. Specifically, feedback is performed on the current target steering angle θa such that the current target steering angle θa becomes a new target steering angle θa, and the steering angle command values θb and θc are determined. Then, the process advances to step S9.

In step S9, the steerings 5a and 5b are operated based on the steering angle command values θb and θc. Specifically, the steerings 5a and 5b change the directions (steering angle θ) of the outboard motors 1a and 1b with respect to the hull 20, and the marine vessel 100 is steered. Then, the process advances to step S10.

In step S10, it is determined whether or not the track point control has been canceled. Specifically, when the steering wheel 31a is operated, both the operation levers 32a and 32b are located at the neutral positions N, or the marine vessel 100 has reached the target position G, the process advances to step S11. When the steering wheel 31a has not been operated, both the operation levers 32a and 32b are not located at the neutral positions N, or the marine vessel 100 has not reached the target position G, the process returns to step S6.

In step S11, the track point control is terminated. Then, the process advances to step S12.

In step S12, the determination of the steering angle command values θb and θc by the feedback control is terminated. Then, the process advances to step S13.

In step S13, the steering angle command values θb and θc are reset. Then, the process advances to step S14.

In step S14, the steering angle command values θb and θc are determined based on an operation on the steering operator 31. Then, the track point control process is terminated.

Figure 16:
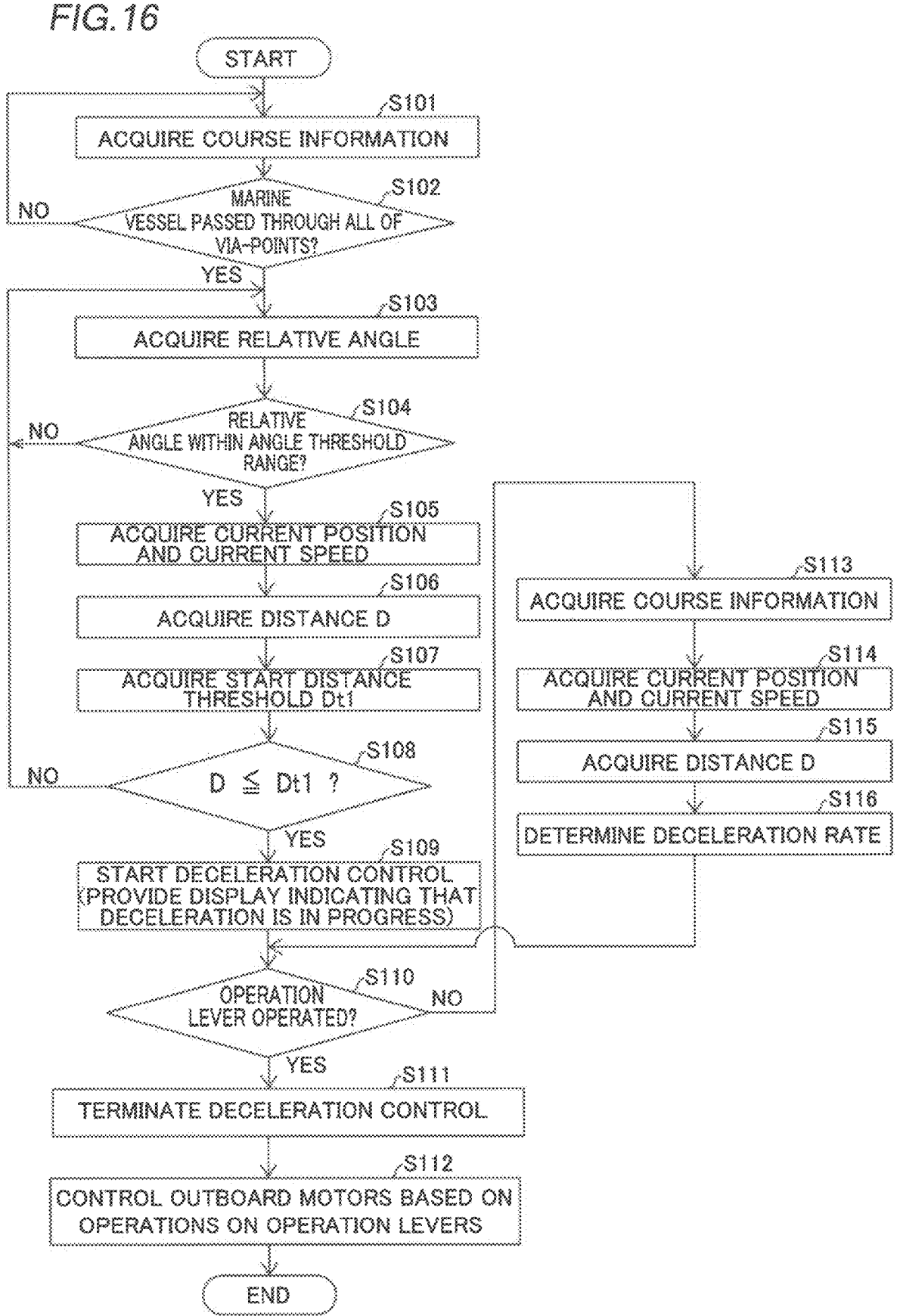
FIG. 16 is a flowchart showing a deceleration control process according to the first preferred embodiment of the present invention.

FIG. 16 is a flowchart of the deceleration control by the propulsion system 10. The control process of the propulsion system 10 is performed by the BCU 2. Furthermore, the deceleration control by the propulsion system 10 is performed during the track point control described above.

In step S101, the course information H including the information about the via-points T and the information about the target position G is acquired from the navigation information display 7. Then, the process advances to step S102.

In step S102, it is determined whether or not the marine vessel 100 has traveled through all of the plurality of via-points T. That is, it is determined whether or not the next point to which the marine vessel 100 heads is the target position G instead of any of the via-points T. When the marine vessel 100 has traveled through all of the plurality of via-points T, the process advances to step S103, and when the marine vessel 100 has not traveled through any of the plurality of via-points, the process returns to step S101.

In step S103, the relative angle φ of the current orientation Ba with respect to a direction E1 from the marine vessel 100 toward the target position G is acquired. Then, the process advances to step S104.

In step S104, it is determined whether or not the relative angle φ is within an angle threshold φt. When the relative angle φ is within the angle threshold φt, the process advances to step S105, and when the relative angle φ is not within the angle threshold φt, the process returns to step S103.

In step S105, the current position Pa and the current speed Va are acquired from the GPS device 4a, and the current orientation Ba is acquired from the electronic compass 4b. Then, the process advances to step S106.

In step S106, the distance D between the target position G and the current position Pa is acquired. Then, the process advances to step S107. When the target position G is changed to a new target position Ga, a distance D between the new target position Ga and the current position Pa is acquired.

In step S107, the start distance threshold Dt1 is acquired based on the map 61 and the current speed Va. Then, the process advances to step S108.

In step S108, it is determined whether or not the distance D is equal to or less than the start distance threshold Dt1. When the distance D is not equal to or less than the start distance threshold Dt1, the process returns to step S103, and when the distance D is not equal to or less than the start distance threshold Dt1, the process advances to step S109.

In step S109, the deceleration control is started. The marine vessel 100 is decelerated by the deceleration degree K1. Then, during the deceleration control, the touch panel 71 provides a display indicating that the marine vessel 100 is decelerating. Then, the process advances to step S110.

In step S110, it is determined whether or not either the operation lever 32a or 32b has been operated. When either the operation lever 32a or 32b has been operated, the process advances to step S111, and when neither the operation lever 32a nor 32b is operated, the process advances to step S113.

In step S111, the deceleration control is terminated. Then, the process advances to step S112.

In step S112, the propulsive forces of the outboard motors 1a and 1b are controlled based on operations on the operation levers 32a and 32b. Then, the deceleration control process is terminated.

In step S113, the course information H is acquired. Even when at least one of the plurality of via-points T or the target position G is changed by the navigation information display 7 (when the target position G is changed to a new target position Ga, for example), the deceleration control is continued. In other words, a control to prohibit acceleration of the marine vessel 100 (a control to prevent acceleration of the marine vessel 100) is performed. Then, the process advances to step S114.

In step S114, the current position Pa and the current speed Va are acquired from the GPS device 4a, and the current orientation Ba is acquired from the electronic compass 4b. Then, the process advances to step S115.

In step S115, the distance D between the target position G and the current position Pa is acquired. Then, the process advances to step S116.

In step S116, the deceleration rate is determined. That is, it is determined based on the distance D whether or not the marine vessel 100 is located in the slow deceleration region, the region in which the marine vessel 100 moves in the semi-planing condition, or the region in the vicinity of the target position G. That is, the distance D is compared with each of the slow deceleration end threshold Dt2, the semi-planing distance threshold Dt3, and the constant speed distance threshold Dt4. When the conditions for starting the emergency deceleration control are satisfied, the emergency deceleration control is performed. Then, the marine vessel 100 is decelerated based on the throttle opening degree Vc based on the determined deceleration degree. Then, the process returns to step S110.

In the structure according to the first preferred embodiment, the following advantageous effects are achieved.

According to the first preferred embodiment, as described above, the BCU 2 is configured or programmed to control the outboard motors 1a and 1b to decelerate the marine vessel 100 that is in motion based on the current orientation Ba with respect to the target position G and the current position Pa with respect to the target position G. Accordingly, the marine vessel 100 is decelerated based on the current position Pa with respect to the target position G, and thus the marine vessel 100 is automatically decelerated before the marine vessel 100 passes through the target position G. The marine vessel 100 is decelerated based on the current orientation Ba with respect to the target position G, and thus the marine vessel 100 is decelerated when the current orientation Ba is appropriate for deceleration. In other words, deceleration of the marine vessel 100 is significantly reduced or prevented when it is not appropriate to decelerate the marine vessel 100 such as when the orientation Ba is currently facing in an opposite direction to the target position G such that the marine vessel 100 is moving away from the target position G. Consequently, when the marine vessel 100 automatically moves toward the target position G, the operation of a user (operator) to decelerate the marine vessel 100 is eliminated. Thus, when the marine vessel 100 is automatically moved toward the target position G, the work burden on the user is reduced.

According to the first preferred embodiment, as described above, the BCU 2 is configured or programmed to control the outboard motors 1a and 1b to decelerate the marine vessel 100 that is in motion based on the current position Pa with respect to the target position G when the relative angle φ of the current orientation Ba with respect to the direction from the marine vessel 100 toward the target position G is within the angle threshold range J. Accordingly, when the relative angle φ of the orientation Ba is currently within the angle threshold range J and the orientation Ba is currently facing the target position G, the marine vessel 100 is decelerated. Consequently, the marine vessel 100 is decelerated while approaching the target position G, and thus the marine vessel 100 is moved to the target position G or the vicinity of the target position G while passage of the marine vessel 100 through the target position G is significantly reduced or prevented.

According to the first preferred embodiment, as described above, the BCU 2 is configured or programmed to control the outboard motors 1a and 1b to decelerate the marine vessel 100 that is in motion based on the current orientation Ba with respect to the target position G and the current position Pa with respect to the target position G when the plurality of via-points T through which the marine vessel 100 travels are acquired and the marine vessel 100 has traveled through all of the plurality of via-points T. Accordingly, the start of deceleration of the marine vessel 100 before passage of the marine vessel 100 through all of the plurality of via-points T is significantly reduced or prevented.

According to the first preferred embodiment, as described above, the BCU 2 is configured or programmed to control the outboard motors 1a and 1b to decelerate the marine vessel 100 based on the current orientation Ba with respect to the target position G when the distance D between the target position G and the current position Pa is equal to or less than the start distance threshold Dt1. Accordingly, the distance D between the target position G and the current position Pa is compared with the start distance threshold Dt1 such that it is easily determined that the marine vessel 100 has approached the target position G. Consequently, a control to decelerate the marine vessel 100 is easily started.

According to the first preferred embodiment, as described above, the BCU 2 is configured or programmed to, when performing a control to decelerate the marine vessel 100, control the outboard motors 1a and 1b to decelerate the marine vessel 100 by the deceleration degree K1 when the distance D is equal to or less than the start distance threshold Dt1 and the distance D is greater than the slow deceleration end threshold Dt2, which is less than the start distance threshold Dt1, and to decelerate the marine vessel 100 by the deceleration degree K2, which is larger than the deceleration degree K1, when the distance D is equal to or less than the slow deceleration end threshold Dt2. Accordingly, when the control to decelerate the marine vessel 100 is started and the distance D between the target position G and the current position Pa is relatively large, the marine vessel 100 is decelerated by the relatively small deceleration degree K1. Consequently, when the control to decelerate the marine vessel 100 is started, an increase in an inertial force caused by the deceleration and applied to the user on the marine vessel 100 is significantly reduced or prevented. When the control to decelerate the marine vessel 100 is started and the distance D between the target position G and the current position Pa becomes relatively small, the marine vessel 100 is sufficiently decelerated by the relatively large deceleration degree K2.

According to the first preferred embodiment, as described above, the BCU 2 is configured or programmed to control the outboard motors 1a and 1b to maintain the speed of the marine vessel 100 constant or substantially constant when the distance D is equal to or less than the semi-planing distance threshold Dt3, which is less than the slow deceleration end threshold Dt2, and the distance D is greater than the constant speed distance threshold Dt4, which is less than the semi-planing distance threshold Dt3, and to decelerate the marine vessel 100 and cause the marine vessel 100 to reach the target position G when the distance D is equal to or less than the constant speed distance threshold Dt4. Accordingly, after the marine vessel 100 is decelerated, the marine vessel 100 approaches the target position G without rapidly changing the speed of the marine vessel 100. For example, when the marine vessel 100 is used for fishing, escape of fish due to waves or sounds caused by a change in the speed of the marine vessel 100 is significantly reduced or prevented.

According to the first preferred embodiment, as described above, the BCU 2 is configured or programmed to perform a control to acquire the current speed Va of the marine vessel 100 and acquire the start distance threshold Dt1, which is a distance threshold to start the control to decelerate the marine vessel 100, based on the map 61 in which the information about the start distance threshold Dt1 and the current speed Va of the marine vessel 100 are associated with each other, and the current speed Va of the marine vessel 100. Accordingly, deceleration of the marine vessel 100 is started from an appropriate position of the marine vessel 100 for the current speed Va of the marine vessel 100.

According to the first preferred embodiment, as described above, the BCU 2 is configured or programmed to, when the BCU 2 performs a control to decelerate the marine vessel 100 and the target position G is changed to the new target position G1, control the outboard motors 1a and 1b to not accelerate the marine vessel 100 when the distance D between the new target position G1 and the current position Pa is greater than the start distance threshold Dt1. Furthermore, the BCU 2 is configured or programmed to control the outboard motors 1a and 1b to decelerate the marine vessel 100 based on the current orientation Ba with respect to the target position G when the distance D between the new target position G and the current position Pa is equal to or less than the start distance threshold Dt1. Accordingly, acceleration of the marine vessel 100 is significantly reduced or prevented when a new target position G is set while the marine vessel 100 is decelerating. Consequently, repeated acceleration and deceleration of the marine vessel 100 is significantly reduced or prevented, and thus when the marine vessel 100 is used for fishing, for example, escape of fish due to waves or sounds caused by a change in the speed of the marine vessel 100 is effectively significantly reduced or prevented.

According to the first preferred embodiment, the marine vessel 100 includes the navigation information display 7 to determine the plurality of via-points T and the target position G. Furthermore, the BCU 2 is configured or programmed to, when performing a control to decelerate the marine vessel 100, control the navigation information display 7 to cancel at least one of the plurality of via-points T or the target position G, or continue the control to decelerate the marine vessel 100 even when at least one of the plurality of via-points T or the target position G is changed by the navigation information display 7. Accordingly, at least one of the plurality of via-points T or the target position G is canceled such that the marine vessel 100 is decelerated without any operation by the user to decelerate the marine vessel 100 even when the BCU 2 is not able to easily acquire the current orientation Ba with respect to the target position G and the current position Pa with respect to the target position G.

According to the first preferred embodiment, as described above, the propulsion system 10 includes the shift actuator 13 to change the shift positions of the outboard motors 1a and 1b, and the operation levers 32a and 32b to operate the shift actuator 13 and change the propulsive forces of the outboard motors 1a and 1b. Furthermore, the BCU 2 is configured or programmed to perform the fixed point holding control to hold the position of the marine vessel 100 at the target position G based on the shift positions moved from the forward movement positions F to the neutral positions N by the operation levers 32a and 32b when performing the deceleration control. Accordingly, the user operates the operation levers 32a and 32b such that the shift positions become the neutral positions N such that the marine vessel 100 is held at the target position G.

According to the first preferred embodiment, as described above, the marine vessel 100 includes the operation levers 32a and 32b to change the propulsive forces of the outboard motors 1a and 1b. Furthermore, the BCU 2 is configured or programmed to perform a control to start the deceleration control to decelerate the marine vessel 100 based on the current orientation Ba with respect to the target position G and the current position Pa with respect to the target position G, and cancel the deceleration control based on operations performed on the operation levers 32a and 32b by the operator when performing a control to decelerate the marine vessel 100 in the deceleration control. Accordingly, even when a control to decelerate the marine vessel 100 is performed in the deceleration control, the deceleration control is canceled according to the intention of the user.

According to the first preferred embodiment, as described above, the marine vessel 100 includes the steering wheel 31a to steer the marine vessel 100. Furthermore, the BCU 2 is configured or programmed to switch, based on the operation on the steering wheel 31a, the control to automatically steer the marine vessel 100 to the control based on the operation on the steering wheel 31a when performing the control to decelerate the marine vessel 100. Accordingly, even when the control to automatically steer the marine vessel 100 is performed, the marine vessel 100 is steered according to the intention of the user while the marine vessel 100 is decelerated.

According to the first preferred embodiment, as described above, the BCU 2 is configured or programmed to control the outboard motors 1a and 1b to decelerate the marine vessel 100 when not acquiring the target position G.

Accordingly, even when the BCU 2 does not acquire the target position G, the marine vessel 100 is decelerated without any operation by the user to decelerate the marine vessel 100.

According to the first preferred embodiment, as described above, the marine vessel 100 includes the GPS device 4a to detect the current position Pa and the electronic compass 4b to detect the current orientation Ba. Furthermore, the BCU 2 is configured or programmed to control the outboard motors 1a and 1b to decelerate the marine vessel 100 when acquiring the information about the abnormality of the GPS device 4a or the electronic compass 4b. Accordingly, even when it is not easy to continue the control to automatically steer the marine vessel 100 due to the abnormality in the GPS device 4a or the electronic compass 4b, the marine vessel 100 is decelerated without any operation by the user to decelerate the marine vessel 100.

According to the first preferred embodiment, as described above, the touch panel 71 is provided on the marine vessel 100. Furthermore, the BCU 2 is configured or programmed to control the outboard motors 1a and 1b to decelerate the marine vessel 100 that is in motion based on the current orientation Ba with respect to the target position G and the current position Pa with respect to the target position G, and control the touch panel 71 to provide a display indicating that the marine vessel 100 is decelerating. Accordingly, the user on the marine vessel 100 visually recognizes that the marine vessel 100 is decelerating.

In the control method according to the first preferred embodiment, the following advantageous effects are achieved.

According to the first preferred embodiment, the propulsion control method of the marine vessel 100 as described above enables a reduction in the work burden on the user when the marine vessel is automatically moved toward the target position G, similarly to the propulsion system 100 of the marine vessel 100.

Second Preferred Embodiment

The structure of a propulsion system 210 of a marine vessel 200 according to a second preferred embodiment of the present invention is now described with reference to FIG. 17. In the second preferred embodiment, a shift actuator 13 is controlled to change shift positions from forward movement positions F to neutral positions N when the marine vessel 200 reaches a target position G, unlike the structure according to the first preferred embodiment in which the fixed point holding control is performed when the marine vessel 100 reaches the target position G. The same or similar structures as those of the first preferred embodiment are denoted by the same reference numerals, and description thereof is omitted.

Figure 17:
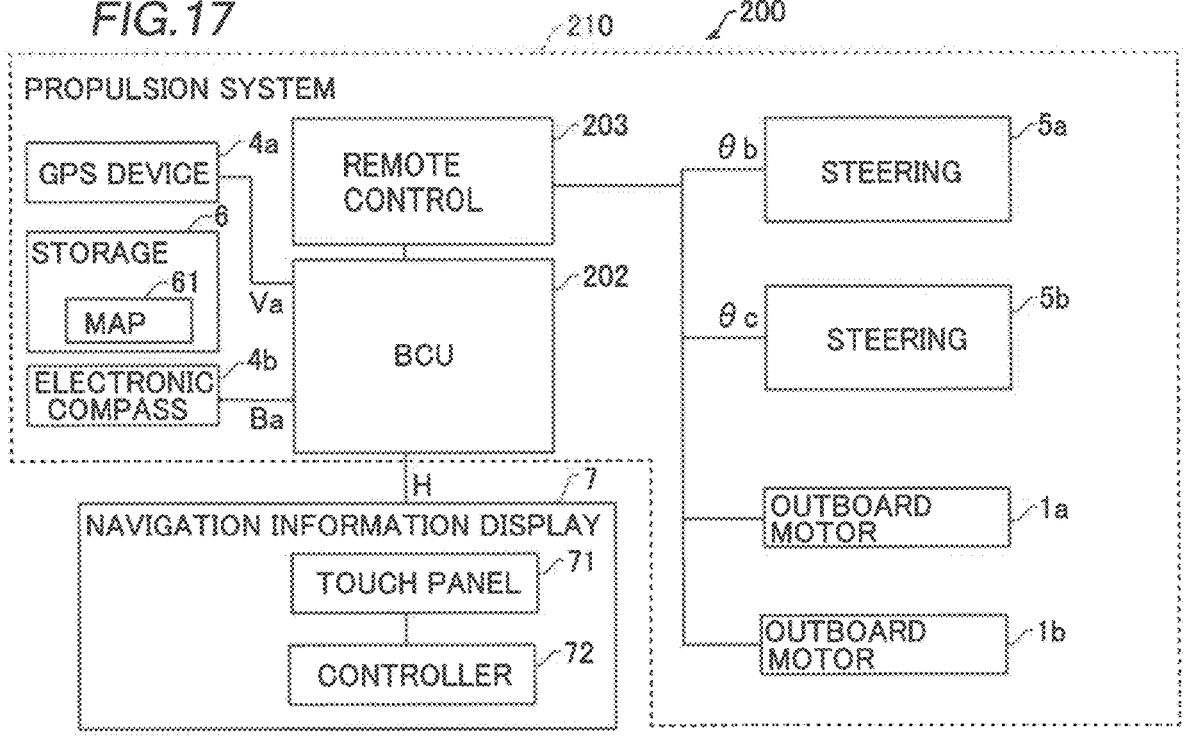
FIG. 17 is a block diagram showing the structure of a marine vessel according to a second preferred embodiment of the present invention.

As shown in FIG. 17, the marine vessel 200 according to the second preferred embodiment includes the propulsion system 210. The propulsion system 210 includes a BCU 202 and a remote control 203. Unlike the remote control 3, the remote control 203 does not include a joystick 35.

The BCU 202 controls (drives) the shift actuator 13 to change the shift positions from the forward movement positions F to the neutral positions N based on the marine vessel 200 that has reached the target position G when performing a deceleration control. The remaining structures of the second preferred embodiment are similar to those of the first preferred embodiment.

According to the second preferred embodiment, the following advantageous effects are achieved.

According to the second preferred embodiment of the present invention, as described above, the marine vessel 200 includes the shift actuator 13 to change the shift positions of outboard motors 1a and 1b. Furthermore, the BCU 202 is configured or programmed to control the shift actuator 13 to change the shift positions from the forward movement positions F to the neutral positions N when the marine vessel 200 reaches the target position G. Accordingly, after the marine vessel 200 reaches the target position G, movement of the marine vessel 200 away from the target position G due to the propulsive force of the marine vessel 200 is significantly reduced or prevented. The remaining advantageous effects of the second preferred embodiment are similar to those of the first preferred embodiment.

MODIFIED EXAMPLES

The preferred embodiments of the present invention described above are illustrative in all points and not restrictive. The extent of the present invention is not defined by the above description of the preferred embodiments but by the scope of the claims, and all modifications (modified examples) within the meaning and range equivalent to the scope of the claims are further included.

For example, while the example in which the marine vessel is an outboard motor boat has been shown in each of the first and second preferred embodiments described above, the present invention is not restricted to this. That is, the marine vessel may be a marine vessel other than an outboard motor boat. For example, the marine vessel may be a marine vessel including an inboard motor(s), an inboard-outboard motor(s), or a jet propulsion device(s).

While the example in which both the plurality of via-points and the target positions are set has been shown in each of the first and second preferred embodiments described above is not restricted to this. That is, the target position may be set without setting the via-points.

While the example in which the angle threshold range is constant has been shown in each of the first and second preferred embodiments described above, the present invention is not restricted to this. For example, a map may be used to change the angle threshold range in response to the current speed of the marine vessel.

While the example in which the start distance threshold is acquired based on the map and the current speed has been shown in each of the first and second preferred embodiments described above, the present invention is not restricted to this. For example, the start distance threshold may be set to a constant value regardless of the current speed. Alternatively, a table may be used without using the map.

While the example in which the deceleration degree is changed in the deceleration control has been shown in each of the first and second preferred embodiments described above, the present invention is not restricted to this. For example, in the deceleration control, the marine vessel may be decelerated by a constant deceleration degree.

While the example in which the emergency deceleration control is performed when the target position is not acquired or when an abnormality occurs in the GPS device or the electronic compass has been shown in each of the first and second preferred embodiments described above, the present invention is not restricted to this. For example, the BCU may be configured or programmed to receive a manual operation by the operator without performing the emergency deceleration control when the target position is not acquired or when an abnormality occurs in the GPS device or the electronic compass.

While the example in which the marine vessel is not accelerated when the target position is changed to a new target position has been shown in each of the first and second preferred embodiments described above, the present invention is not restricted to this. For example, when the marine vessel is not used for fishing, the marine vessel may be accelerated based on a distance between the new target position and the current position of the marine vessel being greater than the start distance threshold.

While the example in which the BCU and the controller of the navigation information display are provided separately from each other has been shown in each of the first and second preferred embodiments described above, the present invention is not restricted to this. For example, the BCU and the controller of the navigation information display may be integral and unitary with each other. That is, the BCU may function as the controller of the navigation information display, or the controller of the navigation information display may function as the BCU.

While the example in which the deceleration control is canceled based on both of the two operation levers moved from the forward movement positions to the neutral positions has been shown in each of the first and second preferred embodiments described above, the present invention is not restricted to this. For example, the marine vessel may include a dedicated operator to cancel the deceleration control.

While the example in which the track point control is canceled when the rotation speed of the steering wheel is equal to or higher than the predetermined rotation speed has been shown in each of the first and second preferred embodiments described above, the present invention is not restricted to this. For example, the track point control may be canceled based on the amount of movement of the steering wheel. For example, the amount of movement is the amount of rotation (degree) of the steering wheel. Specifically, the marine vessel includes an angle sensor to detect the rotational position of the steering wheel. Furthermore, the BCU may be configured or programmed to memorize the angle of the steering wheel at the start of deceleration control detected by the angle sensor, and cancel the track point control when the steering wheel is rotated±10 degrees or more, for example, with respect to the memorized angle. Alternatively, the BCU may be configured or programmed to acquire the steering torque of the steering wheel and cancel the automatic marine vessel maneuvering mode based on the steering torque.

While the example in which the touch panel of the navigation information display provides a display indicating that the marine vessel is decelerating has been shown in each of the first and second preferred embodiments described above, the present invention is not restricted to this. For example, a dedicated display provided separately from the touch panel (display) of the navigation information display may provide a display indicating that the marine vessel is decelerating. Alternatively, in addition to a display on the display or instead of a display on the display, a speaker may notify the user that the marine vessel is decelerating.

While the example in which the electronic compass is used as an orientation sensor, and the GPS device is used as a position sensor has been shown in each of the preferred embodiments described above, the present invention is not restricted to this. For example, an orientation sensor other than the electronic compass may be used, and a position sensor other than the GPS device may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A propulsion system for a marine vessel, the propulsion system comprising:
a propulsion device; and a controller configured or programmed to acquire a target position of the marine vessel, a current position of the marine vessel, and an orientation of the marine vessel, and to perform a control to automatically steer the marine vessel based on the target position, the current position of the marine vessel, and the orientation of the marine vessel that have been acquired; wherein the controller is configured or programmed to control the propulsion device to decelerate the marine vessel based on the orientation of the marine vessel with respect to the target position and the current position of the marine vessel with respect to the target position;

in response to the marine vessel approaching the target position, the controller is configured or programmed to control the propulsion device to decelerate the marine vessel with respect to the target position, that is a final position of the marine vessel at which there is no object, as a distance between the target position and the current position of the marine vessel becomes equal to or less than a first distance threshold in a case that the orientation of the marine vessel is approaching toward the target position;

the controller is configured or programmed to set the first distance threshold to a larger value as a current speed of the marine vessel increases;

as the distance between the target position and the current position of the marine vessel becomes less than or equal to the first distance threshold, the controller is configured or programmed to control the marine vessel to reach the target position at a speed of zero by sequentially: (a) slowing down the marine vessel while navigating the marine vessel in a semi-planing condition in which only a bow is lifted by water resistance, (b) maintaining the marine vessel at a constant speed, (c) slowing down the marine vessel, and then (d) stopping the marine vessel; and the controller is configured or programmed to, during the control to decelerate the marine vessel and the target position is changed to a new target position, control the propulsion device to not accelerate the marine vessel as a distance between the new target position and the current position of the marine vessel becomes greater than the first distance threshold, and is configured or programmed to control the propulsion device to decelerate the marine vessel based on the orientation of the marine vessel with respect to the target position as the distance between the new target position and the current position of the marine vessel becomes equal to or less than the first distance threshold.

2. The propulsion system according to claim 1, wherein the controller is configured or programmed to control the propulsion device to decelerate the marine vessel based on the current position of the marine vessel with respect to the target position as a relative angle of the orientation of the marine vessel with respect to a direction from the marine vessel toward the target position becomes within an angle threshold range.

3. The propulsion system according to claim 1, wherein the controller is configured or programmed to control the propulsion device to decelerate the marine vessel based on the orientation of the marine vessel with respect to the target position and the current position of the marine vessel with respect to the target position as a plurality of via-points through which the marine vessel travels are acquired and the marine vessel has traveled through all of the plurality of via-points.

4. The propulsion system according to claim 1, wherein the controller is configured or programmed to, during the control to decelerate the marine vessel, control the propulsion device to decelerate the marine vessel by a first deceleration degree as the distance becomes equal to or less than the first distance threshold and greater than a second distance threshold that is less than the first distance threshold, and to decelerate the marine vessel by a second deceleration degree that is larger than the first deceleration degree as the distance becomes equal to or less than the second distance threshold.

5. The propulsion system according to claim 4, wherein the controller is configured or programmed to control the propulsion device to maintain the constant speed of the marine vessel as the distance becomes equal to or less than a third distance threshold that is less than the second distance threshold and greater than a fourth distance threshold that is less than the third distance threshold, and to decelerate the marine vessel and cause the marine vessel to reach the target position as the distance becomes equal to or less than the fourth distance threshold.

6. The propulsion system according to claim 1, wherein the controller is configured or programmed to perform a control to acquire a current speed of the marine vessel and acquire the first distance threshold, which is a distance threshold to start the control to decelerate the marine vessel, based on a map in which information about the first distance threshold and information about a speed of the marine vessel are associated with each other, and the current speed of the marine vessel.

7. The propulsion system according to claim 3, further comprising:
a course determiner to determine the plurality of via-points and the target position; wherein
the controller is configured or programmed to, during the control to decelerate the marine vessel, control the course determiner to cancel at least one of the plurality of via-points or the target position, or continue the control to decelerate the marine vessel even as at least one of the plurality of via-points or the target position is changed by the course determiner.

8. The propulsion system according to claim 1, further comprising:
a shift actuator to change a shift position of the propulsion device; and
an operation lever to operate the shift actuator and change a propulsive force of the propulsion device; wherein
the controller is configured or programmed to perform a fixed point holding control to hold a position of the marine vessel at the target position based on the shift position being moved from a forward movement position to a neutral position by the operation lever during the control to decelerate the marine vessel.

9. The propulsion system according to claim 1, further comprising:
a shift actuator to change a shift position of the propulsion device; wherein
the controller is configured or programmed to control the shift actuator to change the shift position from a forward movement position to a neutral position as the marine vessel reaches the target position.

10. The propulsion system according to claim 1, further comprising:
an operation lever to change a propulsive force of the propulsion device; wherein
the controller is configured or programmed to perform the control to start a deceleration mode to decelerate the marine vessel based on the orientation of the marine vessel with respect to the target position and the current position of the marine vessel with respect to the target position, and cancel the deceleration mode based on an operation performed on the operation lever by an operator during the control to decelerate the marine vessel in the deceleration mode.

11. The propulsion system according to claim 1, further comprising:
a steering wheel to steer the marine vessel; wherein
the controller is configured or programmed to switch, based on an operation performed on the steering wheel by an operator, a control to automatically steer the marine vessel to a control based on the operation on the steering wheel during the control to decelerate the marine vessel.

12. The propulsion system according to claim 1, wherein the controller is configured or programmed to control the propulsion device to decelerate the marine vessel as the target position is not acquired.

13. The propulsion system according to claim 1, further comprising:
a sensor to detect at least one of the current position of the marine vessel or the orientation of the marine vessel; wherein
the controller is configured or programmed to control the propulsion device to decelerate the marine vessel as information about an abnormality of the sensor is acquired.

14. The propulsion system according to claim 1, further comprising:
a display provided on the marine vessel; wherein
the controller is configured or programmed to control the propulsion device to decelerate the marine vessel based on the orientation of the marine vessel with respect to the target position and the current position of the marine vessel with respect to the target position, and control the display to provide a display indicating that the marine vessel is decelerating.

15. A propulsion control method for a marine vessel comprising:
acquiring a target position of the marine vessel, a current position of the marine vessel, and an orientation of the marine vessel;
automatically steering the marine vessel based on the target position of the marine vessel, the current position of the marine vessel, and the orientation of the marine vessel that have been acquired;
in response to the marine vessel approaching the target position, decelerating the marine vessel with respect to the target position and the current position of the marine vessel with respect to the target position, that is a final position of the marine vessel at which there is no object, as a distance between the target position and the current position of the marine vessel becomes equal to or less than a first distance threshold in a case that the orientation of the marine vessel is approaching toward the target position;
setting the first distance threshold to a larger value as a current speed of the marine vessel increases;
as the distance between the target position and the current position of the marine vessel becomes less than or equal to the first distance threshold, controlling the marine vessel to reach the target position at a speed of zero by sequentially: (a) slowing down the marine vessel while navigating the marine vessel in a semi-planing condition in which only a bow is lifted by water resistance, (b) maintaining the marine vessel at a constant speed, (c) slowing down the marine vessel, and then (d) stopping the marine vessel; and during the decelerating of the marine vessel and the target position is changed to a new target position, not accelerating the marine vessel as a distance between the new target position and the current position of the marine vessel becomes greater than the first distance threshold, and decelerating the marine vessel based on the orientation of the marine vessel with respect to the target position as the distance between the new target position and the current position of the marine vessel becomes equal to or less than the first distance threshold.

16. The propulsion control method according to claim 15, wherein the decelerating of the marine vessel includes decelerating the marine vessel based on the current position of the marine vessel with respect to the target position as a relative angle of the orientation of the marine vessel with respect to a direction from the marine vessel toward the target position becomes within an angle threshold range.

17. The propulsion control method according to claim 15, further comprising:

acquiring a plurality of via-points through which the marine vessel travels; wherein the decelerating of the marine vessel includes decelerating the marine vessel based on the orientation of the marine vessel with respect to the target position and the current position of the marine vessel with respect to the target position as the marine vessel has traveled through all of the plurality of via-points.

* * * * *